United States Patent
Geiger et al.

(10) Patent No.: US 8,195,730 B2
(45) Date of Patent: Jun. 5, 2012

(54) APPARATUS AND METHOD FOR CONVERSION INTO A TRANSFORMED REPRESENTATION OR FOR INVERSE CONVERSION OF THE TRANSFORMED REPRESENTATION

(75) Inventors: Ralf Geiger, Ilmenau (DE); Gerald Schuller, Erfurt (DE); Thomas Sporer, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1556 days.

(21) Appl. No.: 11/331,551

(22) Filed: Jan. 13, 2006

(65) Prior Publication Data

US 2006/0115171 A1     Jun. 1, 2006

Related U.S. Application Data

(63) Continuation of application No. PCT/EP2004/007326, filed on Jul. 5, 2004.

(30) Foreign Application Priority Data

Jul. 14, 2003 (DE) .................................. 103 31 803

(51) Int. Cl.
*G06F 17/14* (2006.01)
(52) U.S. Cl. ........................................ 708/400; 708/402
(58) Field of Classification Search ........... 708/400–404
See application file for complete search history.

(56) References Cited

U.S. PATENT DOCUMENTS

| 7,512,539 B2 * | 3/2009 | Geiger et al. ............... 704/500 |
| 2007/0276893 A1 * | 11/2007 | Huang et al. ............... 708/400 |
| 2008/0030385 A1 * | 2/2008 | Huang et al. ............... 341/88 |

FOREIGN PATENT DOCUMENTS

| JP | H08-167851 | 6/1996 |
| JP | 2002-311997 | 10/2002 |
| WO | WO 99/56470 | 11/1999 |
| WO | WO 01/95496 | 12/2001 |

(Continued)

OTHER PUBLICATIONS

Hao, P., et al. Matrix Factorization for Reversible Integer Mapping. IEEE Transactions on Signal Processing. vol. 49. No. 10. Oct. 2001.

(Continued)

*Primary Examiner* — Chuong D Ngo
(74) *Attorney, Agent, or Firm* — Michael A. Glenn; Glenn Patent Group

(57) ABSTRACT

For converting first and second blocks of discrete values into a transformed representation, the first block is transformed according to a first transformation rule and then rounded. Then, the rounded transformed values are summed with the second block of original discrete values, to then process the summation result according to a second transformation rule. The output values of the transformation via the second transformation rule are again rounded and then subtracted from the original discrete values of the first block of discrete values to obtain a block of integer output values of the transformed representation. By this multi-dimensional lifting scheme, a lossless integer transformation is obtained, which can be reversed by applying the same transformation rule, but with different signs in summation and subtraction, respectively, so that an inverse integer transformation can also be obtained. Compared to a separation of a transformation in rotations, on the one hand, a significantly reduced computing complexity is achieved and, on the other hand, an accumulation of approximation errors is prevented.

27 Claims, 10 Drawing Sheets

FOREIGN PATENT DOCUMENTS

WO     WO 02/103684    * 12/2002

OTHER PUBLICATIONS

Geiger, R., et al. Audio Coding Based on Integer Transfroms. 111th Convention Audio Engineering Society. New York, NY. Sep. 21-24, 2001.

Geiger, R., et al. INTMDCT-A Link Between Perceptual and Lossless Audio Coding. IEEE. 2002.

Liang, J., et al. Fast Multiplierless Approximations of the DCT with the Lifting Scheme. IEEE Transactions on Signal Processing. vol. 49. No. 12. Dec. 2001.

Zeng, Y., et al. Integer Sinusoidal Transforms Based on Lifting Factorization. IEEE. 2001.

Wang, J., et al. 1-D and 2-D Transforms From Integers to Integers. IEEE. 2003.

"Notification of Reasons for Refusal" mailed Jun. 23, 2009, from the parallel Japanese application No. 2006-519811.

Komatsu, K., et al.; "Reversible Discrete Cosine Transform. Institute of Industrial Science"; May 1998; Proc. of the 1998 IEEE Int'l Conf. on Acoustics, Speech and Signal Processing; Seattle, WA, 3 pages.

* cited by examiner lifting step with transformation matrix during converting inverse lifting step with transformation matrix during inverse conversion

APPARATUS AND METHOD FOR CONVERSION INTO A TRANSFORMED REPRESENTATION OR FOR INVERSE CONVERSION OF THE TRANSFORMED REPRESENTATION

CROSS-REFERENCE TO RELATED APPLICATION

This application is a continuation of copending International Application No. PCT/EP2004/007326, filed Jul. 5, 2004, which designated the United States and was not published in English.

BACKGROUND OF THE INVENTION

1. Field of the Invention

The present invention relates to compression algorithms for discrete values having audio and/or image information, and particularly to transformation algorithms, which are particularly to be used in encoders that are transformation-based, which means perform quantization/coding not of the original audio and/or image signals but comprise transformation into a spectral range prior to quantization/coding.

2. Description of the Related Art

Modern audio encoding methods, such as MPEG Layer3 (MP3) or MPEG AAC use transformations, such as the so-called modified discrete cosine transformation (MDCT) to obtain a block-wise frequency representation of an audio signal. Normally, such an audio encoder receives a stream of time-discrete audio samples. The stream of audio samples is windowed to obtain a windowed block of, for example, 1024 or 2048 windowed audio samples. For windowing, different window functions are used, such as a sine window, etc.

The windowed time-discrete audio samples are then converted into a spectral representation via a filter bank. In principle, a Fourier transformation, or for specific reasons a variation of the Fourier transformation, such as FFT or, as explained above, MDCT, can be used. The block of audio spectral values at the output of the filter bank can then be further processed, if required. In the above-mentioned audio encoders, quantization of the audio spectral values follows, the quantization levels being typically chosen such that the quantization noise introduced by quantization lies below the psycho-acoustic masking threshold, i.e. is "masked away". The quantization is a lossy encoding. To obtain a further data amount reduction, the quantized spectral values are then entropy encoded, for example via Huffman encoding. By adding side information, such as scale factors, etc., a bit stream multiplexer forms a bit stream from the entropy encoded quantized spectral values, which can be stored or transmitted.

In the audio decoder, the bit stream is divided into encoded quantized spectral values and side information via a bit stream demultiplexer. The entropy encoded quantized spectral values are first entropy decoded to obtain the quantized spectral values. The quantized spectral values are then inversely quantized to obtain decoded spectral values, which have quantization noise, which lies below the psycho-acoustic masking threshold and will thus be inaudible. These spectral values will then be converted into a time representation via a synthesis filter bank to obtain time-discrete decoded audio samples. A transformation algorithm inverse to the transformation algorithm has to be used in the synthesis filter bank. Additionally, windowing has to be cancelled after the frequency time inverse transformation.

To obtain a good frequency selectivity, modern audio encoders typically use block overlapping. One such case is illustrated in FIG. 12a. First, for example, 2048 time-discrete audio samples are taken and windowed via a means 402. The window representing means 402 has a window length of 2N samples and provides a block of 2N windowed samples on the output side. In order to achieve window overlapping, a second block of 2N samples is formed via a means 404 which is illustrated in FIG. 12a, merely for clarity reasons, separately from the means 402. The 2048 samples fed into means 404 are, however, not the time-discrete audio samples immediately adjacent to the first window, but comprise the second half of the samples windowed by means 402 and comprise additionally merely 1024 "new" samples. The overlapping is symbolically illustrated by means 406 in FIG. 12a, which effects a degree of overlapping of 50%. Both the 2 N windowed samples output by means 402 and the 2N windowed samples output by means 404 are then subject to the MDCT algorithm via means 408 and 410, respectively. According to the known MDCT algorithm, means 408 provides N spectral values for the first window, while means 410 also provides N spectral values, but for the second window, wherein an overlapping of 50% exists between the first window and the second window.

As illustrated in FIG. 12b, in the decoder, the N spectral values of the first window are supplied to means 412, which performs an inverse modified discrete cosine transformation. The same applies for the N spectral values of the second window. These are supplied to means 414, which also performs an inverse modified discrete cosine transformation. Both means 412 and means 414 each provide 2N samples for the first window and 2N samples for the second window, respectively.

In means 416, which is designated by TDAC (TDAC=time domain aliasing cancellation) in FIG. 12b, the fact that the two windows are overlapping is considered. Particularly, a sample $y_1$ of the second half of the first window, which means with an index N+k, is summed with a sample $y_2$ of the first half of the second window, which means with an index k, so that N decoded time samples result on the output side, which means in the decoder.

It should be noted that by the function of means 416, which is also referred to as an add function, the windowing performed in the encoder illustrated schematically in FIG. 12a is considered automatically, so that no explicit "inverse windowing" has to be performed in the decoder illustrated in FIG. 12b.

When the window function implemented by means 402 or 404 is referred to as w(k), wherein the index k represents the time index, the condition has to be fulfilled that the window weight w(k) squared added to the window weight w(N+k) squared together results in 1, wherein k runs from 0 to N−1. If a sine window is used, the window weightings of which follow the first half wave of the sine function, this condition is always fulfilled, since the square of the sine and the square of the cosine for every angle together result in the value of 1.

It is a disadvantage of the windowing method with subsequent MDCT function described in FIG. 12a that windowing is achieved by multiplication of a time-discrete sample value, when considering a sine window, with a floating-point, since the sine of an angle between 0 and 180 degrees does not result in an integer, except the angle of 90 degrees. Even when integer time-discrete samples are windowed, floating-point numbers result after windowing.

Thus, even when no psycho-acoustic encoder is used, which means when a lossless encoding is to be obtained, quantization is required at the output of means 408 and 410, respectively, in order to be able to perform a reasonably manageable entropy encoding.

Generally, currently known integer transformations for lossless audio and/or video encoding are obtained by separating the transformations used there into Givens rotations and by applying the lifting scheme to every Givens rotation. Thereby, a rounding error is introduced in every step. For subsequent stages of Givens rotations, the rounding error keeps accumulating. The resulting approximation error becomes particularly problematic for lossless audio encoder approaches, particularly when long transformations are used, which provide, for example, 1,024 spectral values, such as it is, for example, the case in the known MDCT with overlap and add (MDCT=modified discrete cosine transformation). Particularly in the higher frequency range, where the audio signal typically has a very low amount of energy anyway, the approximation error can quickly become larger than the actual signal, so that this approach is problematic with regard to lossless encoding and particularly with regard to the encoding efficiency obtainable thereby.

With regard to audio encoding, integer transformations, which means transformation algorithms generating integer output values, are particularly based on the known DCT-IV, which considers no constant component, while integer transformations for image applications are rather based on the DCT-II, which particularly contains the provisions for the constant component. Such integer transformations are described, for example, in Y. Zeng, G. Bi and Z. Lin, "Integer sinusoidal transforms based on lifting factorization", in Proc. ICASSP'01, May 2001, pp. 1,181-1,184, K. Komatsu and K. Sezaki, "Reversible Discrete Cosine Transform", in Proc. ICASSP, 1998, Vol. 3, pp. 1,769-1,772, P. Hao and Q. Shi, "Matrix factorizations for reversible integer mapping", IEEE Trans. Signal Processing, Signal Processing, Vol. 49, pp. 2,314-2,324, and J. Wang, J. Sun and S. Yu, "1-d and 2-d transforms from integers to integers", in Proc. ICASSP'03, Hong Kong, April 2003.

As has been explained above, the integer transformations described there are based on the separation of the transformation into Givens rotations and on the application of the known lifting scheme to the Givens rotations, which involves the problem of accumulating rounding errors. This is particularly due to the fact that rounding has to be performed several times within one transformation, which means after every lifting step, so that particularly in long transformations, which involve correspondingly many lifting steps, rounding has to be performed particularly often. As has been explained, this results in an accumulated error and particularly in a relatively expensive processing, since rounding is performed after every lifting step to perform the next lifting step.

SUMMARY OF THE INVENTION

It is an object of the present invention to provide a more efficient and exact concept for conversion of discrete values into a transformed representation and for a corresponding inverse conversion of the transformed representation.

It is a further object of the present invention to provide a towards transformation apparatus as well as a back transformation apparatus, which comprise the inventive concept for converting and the inventive concept for inverse converting, respectively.

In accordance with a first aspect, the present invention provides an apparatus for converting discrete values into a transformed representation with integer values, wherein the discrete values have audio and/or image information, having: a means for processing a first block of discrete values by using a first transformation rule to obtain a first block of transformed values; a means for rounding the first block of transformed values to obtain a first block of rounded transformed values; a means for summing the first block of rounded transformed values to a second block of discrete values to obtain a second block of summed values; a means for processing the second block of summed values by using a second transformation rule to obtain a second block of transformed values; a means for rounding the second block of transformed values to obtain a second block of rounded transformed values; and a means for subtracting the second block of rounded transformed values of the first block of discrete values to obtain a block of integer output values of the transformed representation.

In accordance with a second aspect, the present invention provides a towards transformation apparatus, having: a means for windowing a first block of samples representing an audio signal or an image signal, and for windowing a second block of samples representing an audio signal or an image signal by using several lifting matrices and subsequent rounding operations to obtain a first block of discrete values and a second block of discrete values; and an apparatus according to claim 1 to obtain a transformed representation from the first and second blocks with integer output values.

In accordance with a third aspect, the present invention provides a method for converting discrete values into a transformed representation with integer values, wherein the discrete values have audio and/or image information, the method having the steps of: processing a first block of discrete values by using a first transformation rule to obtain a first block of transformed values; rounding the first block of transformed values to obtain a first block of rounded transformed values; summing the first block of rounded transformed values to a second block of discrete values to obtain a second block of summed values; processing the second block of summed values by using a second transformation rule to obtain a second block of transformed values; rounding the second block of transformed values to obtain a second block of rounded transformed values; and subtracting the second block of rounded transformed values from the first block of discrete values to obtain a block of integer output values of the transformed representation.

In accordance with a fourth aspect, the present invention provides a towards transformation method, having the steps of: windowing a first block of samples representing an audio signal or an image signal, and windowing a second block of samples representing an audio signal or an image signal by using several lifting matrices and subsequent rounding operations to obtain a first block of discrete values and a second block of discrete values; and a method according to claim 17 to obtain a transformed representation from the first and second blocks with integer output values.

In accordance with a fifth aspect, the present invention provides an apparatus for inverse conversion of a block of integer output values and a second block of summed values, which are a transformed representation of discrete values, to obtain first and second blocks of discrete values, wherein the block of integer output values and the second block of summed values are derived from the first and second blocks of discrete values, by processing a first block of discrete values by using a first transformation rule to obtain a first block of transformed values, rounding the first block of transformed values to obtain a first block of rounded transformed values, summing the first block of rounded transformed values to a second block of discrete values to obtain the second block of summed values, processing the second block of summed values by using a second transformation rule to obtain a second block of transformed values, rounding the second block of transformed values to obtain a second block of rounded transformed values, and subtracting the second block of rounded transformed values from the first block of discrete values to obtain a block of integer output values of the transformed representation, having: a means for processing the second block of summed values by using the second transformation rule to obtain a first block of transformed output values; a means for rounding the first block of transformed output values to obtain a first block of rounded transformed values; a means for summing the first block of rounded transformed output values to the block of integer output values to obtain the first block of discrete values; a means for processing the first block of discrete values by using the first transformation rule to obtain a second block of transformed values; a means for rounding the second block of transformed values to obtain a block of rounded transformed values; and a means for subtracting the block of rounded transformed values from the second block of summed values to obtain the second block of discrete values.

In accordance with a sixth aspect, the present invention provides a method for inversely converting a block of integer output values and a second block of summed values, which are a transformed representation of discrete values, to obtain first and second blocks of discrete values, wherein the block of integer output values and the second block of summed values have been derived from the first and second blocks of discrete values, by processing a first block of discrete values by using a first transformation rule to obtain a first block of transformed values, rounding the first block of transformed values to obtain a first block of rounded transformed values, summing the first block of rounded transformed values to a second block of discrete values to obtain the second block of summed values, processing the second block of summed values by using a second transformation rule to obtain a second block of transformed values, rounding the second block of transformed values to obtain a second block of rounded transformed values, and subtracting the second block of rounded transformed values from the first block of discrete values to obtain a block of integer output values of the transformed representation, the method having the steps of: processing the second block of summed values by using the second transformation rule to obtain a first block of transformed output values; rounding the first block of transformed output values to obtain a first block of rounded transformed values; summing the first block of rounded transformed output values to the block of integer output values to obtain the first block of discrete values; processing the first block of discrete values by using the first transformation rule to obtain a second block of transformed values; rounding the second block of transformed values to obtain a block of rounded transformed values; and subtracting the block of rounded transformed values from the second block of summed values to obtain the second block of discrete values.

In accordance with a seventh aspect, the present invention provides a back transformation apparatus, having: an apparatus according to claims 19, and a means for inverse windowing of the first and second blocks of discrete values by using lifting matrices and subsequent rounding operations to obtain first and second blocks of original values representing audio samples or image samples.

In accordance with an eighth aspect, the present invention provides a back transformation method, having the steps of: a method according to claim 21; and inverse windowing of the first and second blocks of discrete values by using lifting matrices and subsequent rounding operations to obtain first and second blocks of original values representing audio samples or image samples.

In accordance with a ninth aspect, the present invention provides a computer program with a program code for performing a method for converting discrete values into a transformed representation with integer values, wherein the discrete values have audio and/or image information, having the steps of: processing a first block of discrete values by using a first transformation rule to obtain a first block of transformed values; rounding the first block of transformed values to obtain a first block of rounded transformed values; summing the first block of rounded transformed values to a second block of discrete values to obtain a second block of summed values; processing the second block of summed values by using a second transformation rule to obtain a second block of transformed values; rounding the second block of transformed values to obtain a second block of rounded transformed values; and subtracting the second block of rounded transformed values from the first block of discrete values to obtain a block of integer output values of the transformed representation; when the computer program runs on a computer.

In accordance with a tenth aspect, the present invention provides a computer program with a program code for performing a method for inversely converting a block of integer output values and a second block of summed values, which are a transformed representation of discrete values, to obtain first and second blocks of discrete values, wherein the block of integer output values and the second block of summed values have been derived from the first and second blocks of discrete values, by processing a first block of discrete values by using a first transformation rule to obtain a first block of transformed values, rounding the first block of transformed values to obtain a first block of rounded transformed values, summing the first block of rounded transformed values to a second block of discrete values to obtain the second block of summed values, processing the second block of summed values by using a second transformation rule to obtain a second block of transformed values, rounding the second block of transformed values to obtain a second block of rounded transformed values, and subtracting the second block of rounded transformed values from the first block of discrete values to obtain a block of integer output values of the transformed representation, having the steps of: processing the second block of summed values by using the second transformation rule to obtain a first block of transformed output values; rounding the first block of transformed output values to obtain a first block of rounded transformed values; summing the first block of rounded transformed output values to the block of integer output values to obtain the first block of discrete values; processing the first block of discrete values by using the first transformation rule to obtain a second block of transformed values; rounding the second block of transformed values to obtain a block of rounded transformed values; and subtracting the block of rounded transformed values from the second block of summed values to obtain the second block of discrete values; when the computer program runs on a computer.

The present invention is based on the knowledge that by extending the one-dimensional lifting scheme to a multi-dimensional lifting scheme as well as by cascaded executing of at least two such lifting steps, on the one hand, the rounding error is reduced and, on the other hand, the computing efficiency is improved. Therefore, according to the invention, at least two blocks of values comprising audio and/or image information are required, which are each submitted to an arbitrary transformation algorithm. According to the invention, rounding is performed only after performing the complete transforming algorithm. This means that first, for example, the output result values, such as the spectral values, of a $1^{st}$ transformation are rounded and the output results of a $2^{nd}$ transformation are rounded, respectively. Thus, it is not required to round within the transformation. Thus, any arbitrary existing and particularly any already tested transformation rule, in the form of, for example, a program code, which exists and is freely available, can be used as $1^{st}$ and $2^{nd}$ transformation rule, without having to separate the transformation itself into individual rotations as in the prior art, by interfering with the actual transformation.

According to the invention, the second block is used as carrier for the transformed representation of the first block, by summing the second block with the transformed representation of the first block. Further, according to the invention, the first block is used as a carrier for a transformed representation of the second block by subtracting the transformed representation of the second block, which already contains the spectral values of the first block, from the first block.

Since according to the invention, rounding is performed merely after the $1^{st}$ and $2^{nd}$ transformation, respectively, and since the rounded values are additively and subtractively superimposed, respectively, on the corresponding carrier values, a cancellation of the steps performed in the conversion can be obtained without data loss in the inverse conversion, so that an integer transformation algorithm results, which can, on the one hand, be implemented in a computing-efficient way and wherein, on the other hand, no accumulation of rounding errors occurs. This is due to the fact that rounding is only performed after a full 1st or 2nd transformation, which, on the one hand, eliminates the accumulation of rounding errors and, on the other hand, significantly reduces the number of rounding steps, compared to the case where the transformation itself is separated into rotations, where rounding is performed after every lifting step itself, within the actual transformation algorithm.

It is an advantage of the present invention that further any conventional non-integer transformation rules can be used, since rounding only has to be performed after the transformation.

Further, the present invention is advantageous in that fast algorithms, whose effort O does not rise according to $N^2$, but merely rises N log N, can be used. This is particularly significant for audio signals, since the value N, which means the transformation length, is relatively large in audio signals, and is about 1,024 values in the above-described known audio compression methods.

In a preferred embodiment of the present invention, wherein an integer version of the known floating-point MDCT transformation is used, the known DCT-IC transformation is the transformation rule, which comprises an identical transformation matrix as transformation rule for the $1^{st}$ and the $2^{nd}$ transformation. Further, in order to obtain a fully integer transformation, which corresponds to the MDCT with overlap and add, it is preferred to combine the windowing of the common MDCT with the time domain aliasing cancellation functionality (TDAC functionality) and express it by Givens rotations, which can again be calculated in an integer way by a lifting scheme, to achieve a fully integer version of the MDCT.

The two blocks of discrete value supplied to the inventive conversion apparatus correspond to the Givens-rotated values of the overlapping windowed blocks of the time-discrete audio samples or discrete image samples or image residual values after a prediction in a modern video compression algorithm, wherein the DCT-IV algorithm is preferred as transformation algorithm in the case of audio data. On the decoder side, again, the DCT-IV algorithm is preferred as frequency-time transformation apparatus, which is again followed by a rotation stage, which performs an inverse lifting scheme to retrieve the N roundings introduced at the encoder side, which means the roundings introduced in the time-frequency transformation, in a lossless way.

BRIEF DESCRIPTION OF THE DRAWINGS

These and other objects and features of the present invention will become clear from the following description taken in conjunction with the accompanying drawings, in which:

FIG. 12b is a block diagram of a known decoder for decoding the values generated by FIG. 10a.

DESCRIPTION OF THE PREFERRED EMBODIMENTS

Figure 1:
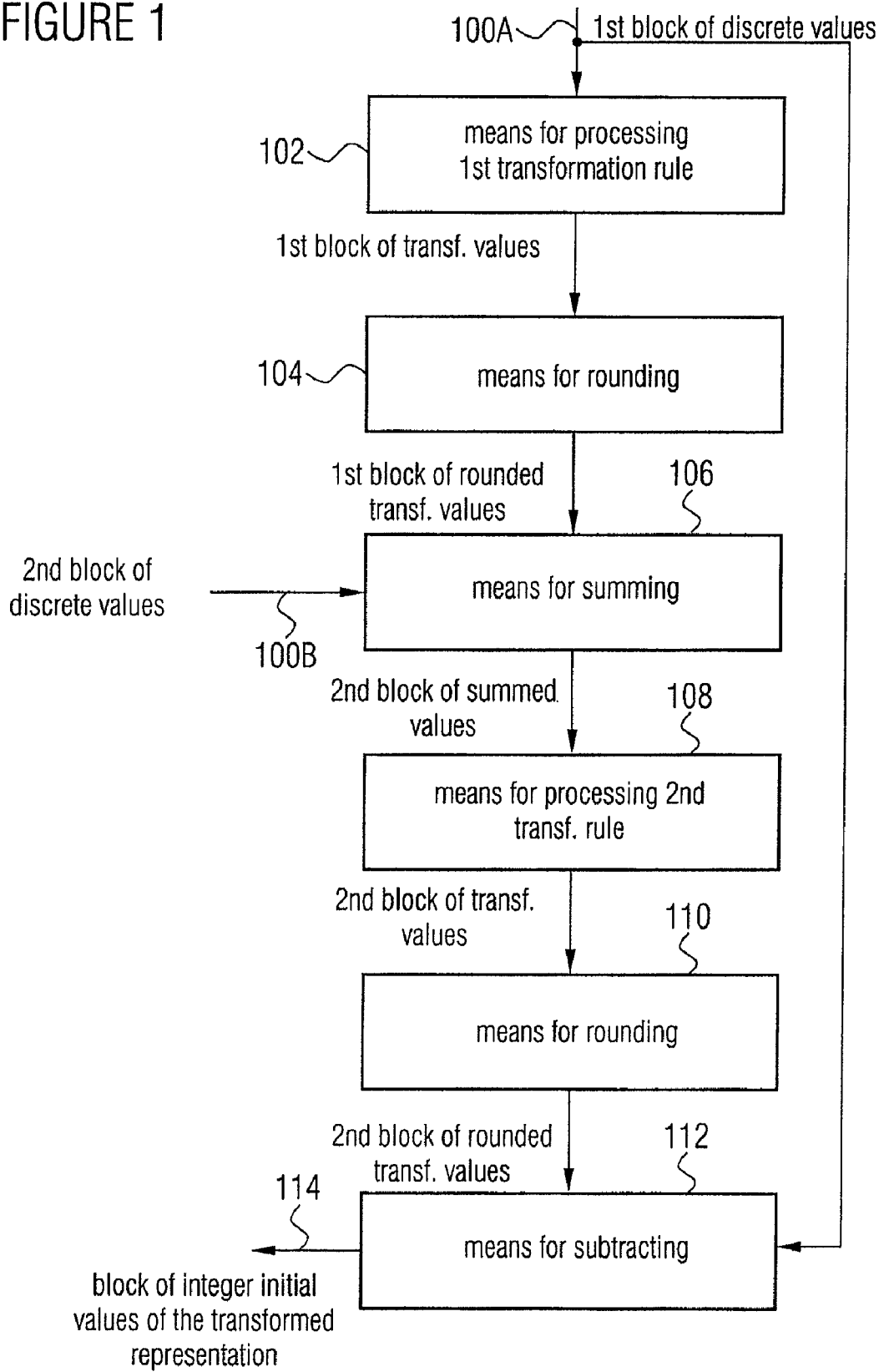
FIG. 1 is a block diagram of an inventive apparatus for converting.

FIG. 1 shows an inventive apparatus for converting discrete values into a transformed representation with integer values. The discrete values are fed into the inventive apparatus via a first input 100a as well as a second input 100b. The first block of discrete values is fed in via the input 100a, while a second block of discrete values is fed in via the input 100b. The discrete values represent audio data or image data and video data, respectively. As will be explained below, the first block of discrete values and the second block of discrete values can actually comprise two blocks of audio samples successive in time. The first and second blocks of discrete values can also comprise two images and residual values, respectively, represented by discrete values after a prediction or difference values in a difference encoding, etc. Alternatively, the two blocks of discrete values can have been subject to preprocessing, such as in the integer implementation of the MDCT, where the first block and the second block of discrete values have been generated by Givens rotations from actually windowed samples. The first and second blocks of discrete values can thus be derived from original audio data or image data by any processings, such as rotations, permutations, plus/minus butterflies, scalings, etc. Still, the first and second blocks of discrete values contain audio information and image information, respectively, although they are not directly audio samples or discrete image values.

The first block of discrete values is fed into the means 102 for processing the first block of discrete values by using a $1^{st}$ transformation rule via the input 100a, to obtain a first block of transformed values at an output of means 102, as it is shown in FIG. 1. This first block of transformed values will typically not be integer, but will comprise floating-point values, as they are typically obtained by any transformation rule, such as a Fourier transformation, a Laplace transformation, an FFT, a DCT, a DST, an MDCT, an MDST or any other transformation, such as a wavelet transformation with arbitrary base functions. The first block of transformed values is fed into means 104 for rounding the first block of transformed values to obtain a first block of rounded transformed values on the output side. The means 104 for rounding is formed to perform any rounding function, such as rounding by truncating or rounding up or rounding off, respectively, to be performed in dependence on the floating-point value.

The rounding rule, which is implemented by means 104, is thus responsible for the fact that the first block of rounded transformed values again merely has integer values, whose accuracy is determined by the rounding rule used by means 104. The first block of rounded transformed values is supplied to means 106 for summing, as well as the second block of discrete values applied to the second input 100b, to obtain a second block of summed values. If the audio signal example is considered, it can be seen that spectral values from the first block are added to rounded transformed values of the first block of rounded transformed values are added to time values from the second block of discrete values by means 106. If the discrete values of the second block are, for example, present as voltage values, it is recommended that the first block of rounded transformed values is also present as voltage amplitudes, which means values with the unit V. In this case, there will be no unit problem in summation. For persons skilled in the art, however, it will be appreciated that any unit standardizations can be performed with the first block of rounded transformed values and the second block of discrete values, respectively, in that both the first block of rounded transformed values and the second block of discrete values are, for example, without units.

The second block of summed values is supplied to a means 108 for processing the second block of summed values by using a $2^{nd}$ transformation rule to obtain a second block of transformed values. If the transformation rule used in means 102 is, for example, a time-frequency transformation rule, then the $2^{nd}$ transformation rule, which is used in block 108, is, for example, a frequency-time transformation rule. These relations can also be reversed, so that the first and second blocks of discrete values are, for example, spectral values, so that time values are obtained by means 102 for processing under the transformation rule, while again spectral values are obtained by the means for processing via the inverse transformation rule, which is the means 108. Thus, the $1^{st}$ and a $2^{nd}$ transformation rules can be a towards transformation rule or a back transformation rule, wherein the inverse transformation rule is the back transformation rule and the towards transformation rule, respectively.

The second block of transformed values is fed into a means 110 for rounding, as shown in FIG. 1, to obtain a second block of rounded transformed values, which will then finally be fed into a means 112 for subtracting, to subtract the second block of rounded transformed values from the first block of discrete values, which is fed in via the first input 108a, to obtain a block of integer output values of the transformed representation, which can be output at an output 114. By processing the block of integer output values of the transformed representation by using an arbitrary third transformation rule, which has also been used in the means 102 or differs from the same, and by subsequently rounding the block of transformed output values to obtain a block of rounded transformed output values and by subsequent summing of the block of rounded transformed output values and the second block of summed values, a further block of integer output values of the transformed representation can be obtained, which provides a complete transformed representation of the first and second blocks of discrete values with the block of integer output values applied to the output 114.

But even without the last three steps of processing, rounding and summing, where the block of integer output values of the transformed representation is applied to the output 114, part of the whole transformed representation can already be obtained, namely e.g. the first half, which enables a recalculation of the first and second blocks of discrete values, when it is subject to the inverse processing.

Here, it should be noted that depending on the transformation rule, the $1^{st}$, $2^{nd}$ and if necessary $3^{rd}$ transformation rule can be identical. This is, for example, the case in the DCT-IV. If an FFT was used as $1^{st}$ transformation rule, the IFFT, which is not identical to the FFT, could be used as a second (inverse) transformation rule.

For computational reasons, it is preferred to provide the transformation rule in the form of a matrix, which is then a square N×N matrix when the number of discrete values of the first block is equal to the number of discrete values of the second block, when the number of discrete values of the first block and the number of discrete values of the second are each equal to N.

In a preferred embodiment of the present invention, the means 104 and 110 for rounding are formed to round, according to a rounding function which provides rounded results, the accuracy of which is less than a machine accuracy inherent to the computer performing the functionalities as shown in FIG. 1. According to the rounding function, it should be noted that the same maps a non-integer number to the next higher or smaller integer, merely in one preferred embodiment. The rounding function can also map to other integers, such as the number 17.7 to the number 10 or the number 20, as long as the rounding function effects a decrease of the accuracy of the number to be rounded. In the above example, the unrounded number is a number with one digit after the decimal point, while the rounded number is a number which has no digit after the decimal point.

Although the means 102 for processing by using the $1^{st}$ transformation rule and the means 108 for processing by using the $2^{nd}$ transformation rule are shown as separate means in FIG. 1, it should be noted that in a specific implementation, merely one transformation function unit can be present, which, controlled by a specific sequence control, first transforms the first block of discrete values and then inverse-transforms the second block of summed values at the respective time of the algorithm. Then, the first and second transformation rules would be identical. The same applies for the two means 104, 110 for rounding. These also do not have to be provided as separate means, but can be implemented by a rounding function unit, which again, controlled by the sequence control depending on the requirements of the algorithm, first rounds the first block of transformed values and then the second block of transformed values.

Figure 9:
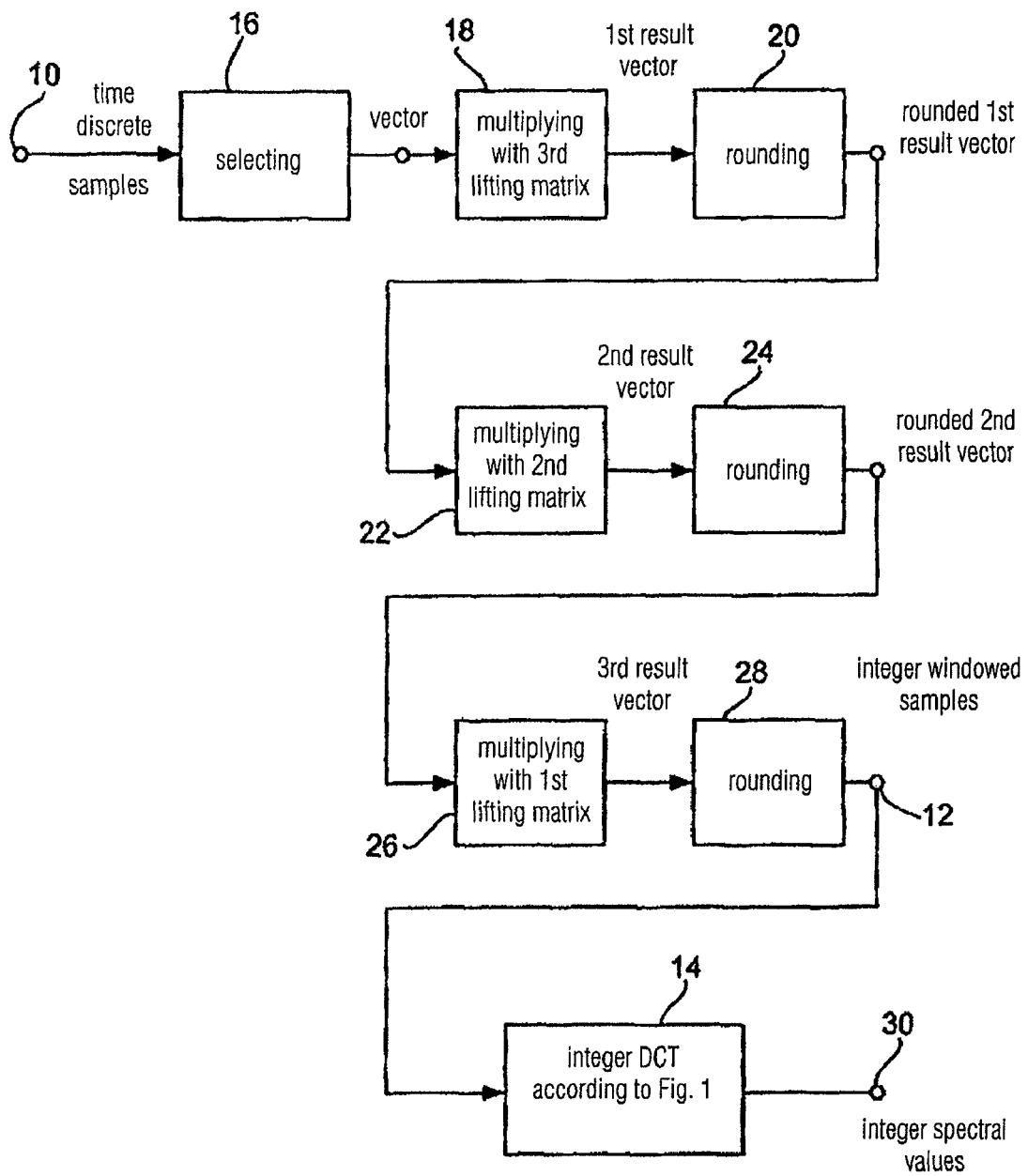
FIG. 9 is a block diagram of a preferred means for processing time-discrete audio samples to obtain integer values from which integer spectral values can be determined.

In a preferred embodiment of the present invention, the first block of discrete values and the second block of discrete values are the integer windowed samples, as they are obtained at the output of block 28 in FIG. 9, which will be discussed below. The integer DCT in block 14 of FIG. 9 is then implemented by the integer algorithm shown in FIG. 1, such that the transformed representation represents the integer spectral value at the output 30 of the apparatus shown in FIG. 9, in the example of the audio signal relating to FIG. 9.

Figure 4:
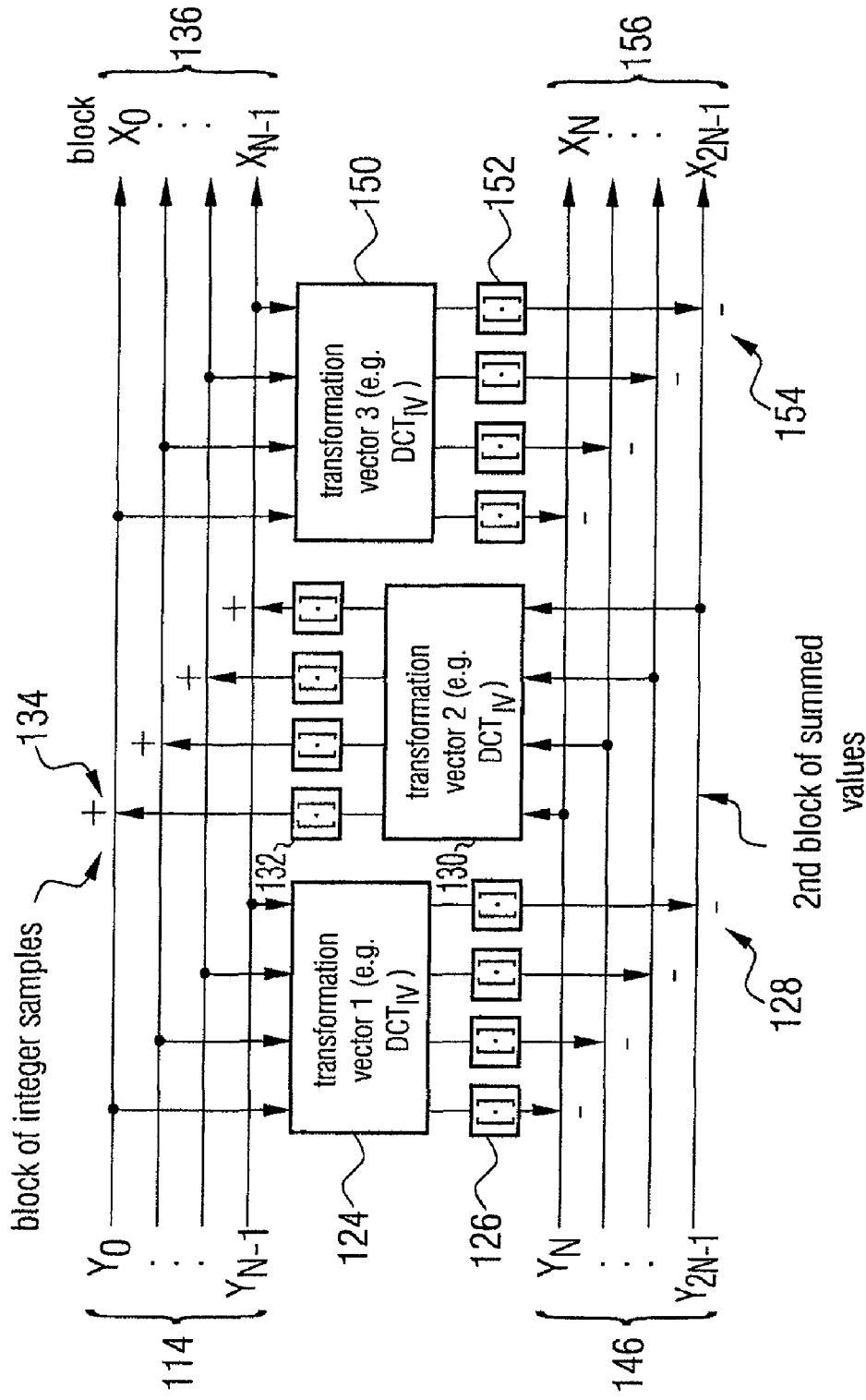
FIG. 4 is an apparatus for inverse converting according to a preferred embodiment of the present invention.

In the following, with regard to FIG. 2, a means for inverse transforming corresponding to FIG. 1 will be illustrated, where apart from the block of integer output values at the output of Block 112 of FIG. 1, also the second block of summed values is used at the output of means 106 of FIG. 1. With reference to FIG. 4, which will be discussed in more detail below, this corresponds to the case that merely the blocks 150 and 130 are present but not the transformation block 124.

Figure 2:
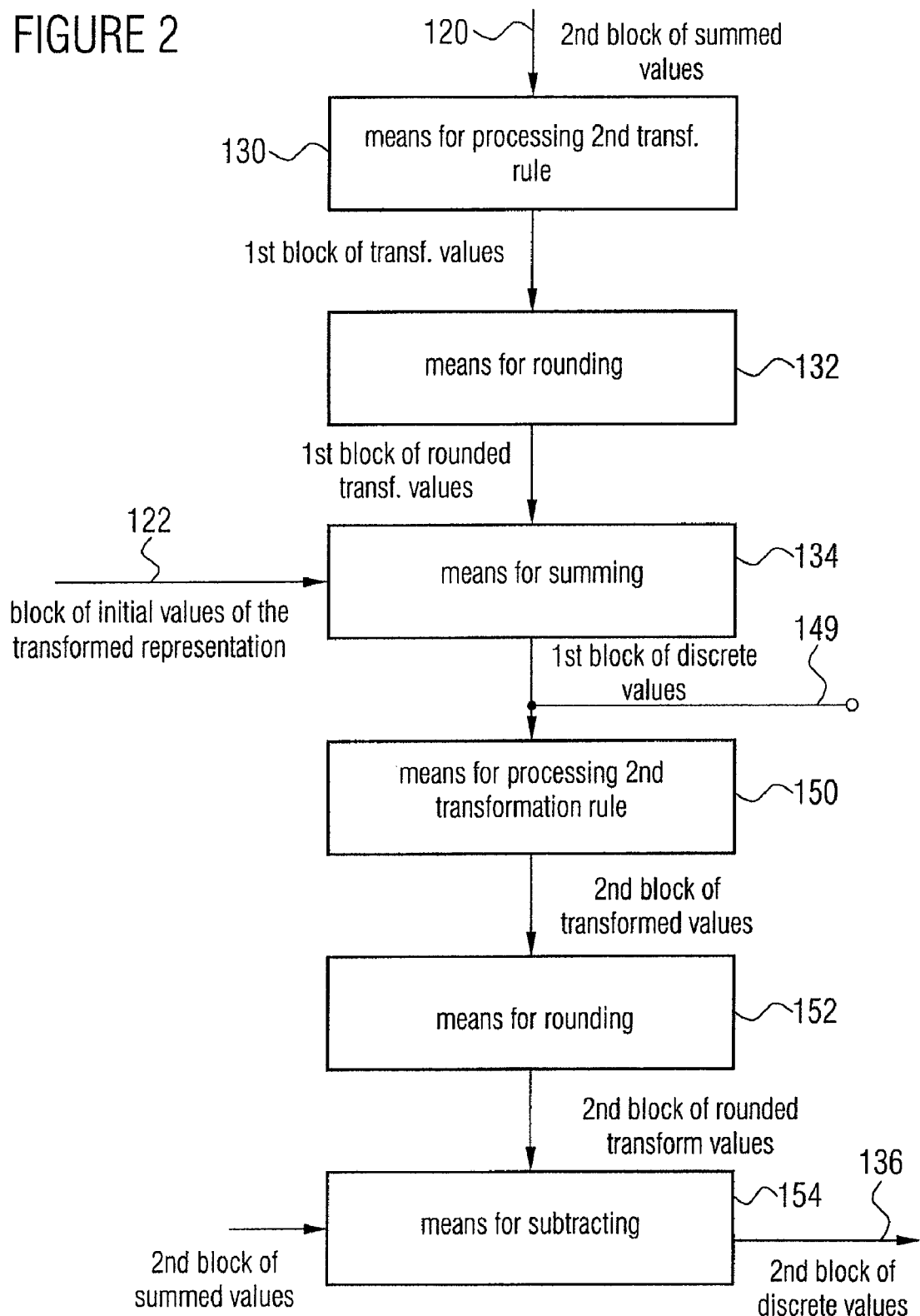
FIG. 2 is a block diagram of an inventive apparatus for inverse converting.

FIG. 2 shows an inventive apparatus for inverse conversion of a block of integer output values of the transformed representation, as it will be obtained at the output 114 of FIG. 1, and the second block of summed values. The $2^{nd}$ block of summed values is fed into an input 120 of the apparatus for inverse conversion shown in FIG. 2. The block of output values of the transformed representation is fed into a further input 122 of the apparatus for inverse conversion.

The $2^{nd}$ block of summed values is fed into a means 130 for processing this block by using the $2^{nd}$ transformation rule, when the last used transformation rule during encoding was the $2^{nd}$ transformation rule. On the output side, the means 130 supplies a first block of transformed values, which is supplied to a means 132 for rounding, which again generates a first block of rounded transformed values on the output side. The first block of rounded transformed values is then subtracted from the block of output values of the transformed representation by a means 134 in order to obtain the first block of discrete values at a first output 149 of the apparatus of FIG. 2.

This first block of discrete values is supplied to a means 150 for processing this block by using the $1^{st}$ transformation rule to obtain a second block of transformed values at the output of means 150. This second block of transformed subtracted values is again rounded in means 152 to obtain a second block of rounded transformed values. This second block of rounded transformed values is then subtracted from the $2^{nd}$ block of summed values provided on the input side, which has been input via the input 120, to obtain a second block of discrete values at an output 136 on the output side.

With regard to the relation of $1^{st}$, $2^{nd}$, and $3^{rd}$ transformation rules as well as with regard to the specific implementation of the individual function blocks in FIG. 2 by common function units and a corresponding sequence control/temporary storage, reference is made to the explanations made with regard to FIG. 1.

In the following, with reference to FIG. 3, a preferred embodiment of the apparatus for converting into a transformed representation generally illustrated in FIG. 1 will be discussed. The embodiment in FIG. 1 comprises a further transformation/rounding compared to FIG. 1, in order to generate the further block of integer output values from the second block of summed values.

The first input 100a comprises N input lines $x_0, \ldots, x_{N-1}$ for inputting N values of the first block of discrete values. The second input 100b also comprises N lines for inputting the N values $x_N, \ldots, x_{2N-1}$ of the second block of discrete values. The means 102 of FIG. 1 is shown in FIG. 3 as DCT-IV transformer. The DCT transformer 102 is formed to generate N output values from N input values, each of which will then be rounded by means 104 by the rounding specification indicated by "[.]" as shown in FIG. 3. The means 106 for summing is illustrated such that a value-wise up-summation takes place. This means that the output value of means 102 with index 0 is summed with the first value of the second block of discrete values having the index N. Generally, thus, the value of the first block of rounded transformed values with an ordinal number i is summed individually at the output of rounding means 104 with the discrete value of the second block of output values with an ordinal number N+i, wherein i is a running index running from 0 to N−1.

The means 108 for processing by using the $2^{nd}$ transformation rule is also drawn as a DCT-IV transformer. In the preferred embodiment shown in FIG. 3, means 112 for subtracting is also formed to perform a value-wise subtraction, in that the output values of the rounder 110, which means the values of the second block of rounded transformed values are individually subtracted from the first block of discrete values. In the embodiment shown in FIG. 3, it is preferred to perform a corresponding subtraction, in that a value of the second block is an ordinal number of N+i is subtracted from a value of the first block with the ordinal number i, wherein i again runs from 0 to N−1. Alternatively, other summations/subtractions can be performed, in that, for example, a value of a block with the ordinal number N−1 is subtracted from the value of the other block with the ordinal number N−1 as long as this is correspondingly considered in the inverse conversion.

On the output side, the means 112 for subtracting already supplies a block of integer output values of the transformed representation, which means the integer output values $y_0$ to $y_{N-1}$ of the transformed representation. In order to obtain, if optionally desired, the remaining integer output values of the transformed representation, which means the further block $y_N$ to $y_{2N-1}$, the block of integer output values of the transformed representation applied to the output 114 is subject to a transformation by using the third transformation rule by the towards transformer 140, wherein the output values of the same are again rounded as illustrated by a rounding means 142 to perform an addition of these values with the second block of summed values at the output of the summator 106, as represented by reference number 144 in FIG. 3. The output values of the summator 144 represent a further block 146 of integer output values of the transformed representation, which is indicated by $y_N$ to $y_{2N-1}$.

In the following, an inventive apparatus for inverse converting of the transformed representation according to a preferred embodiment will be illustrated with reference to FIG. 4. It should be noted that the operations performed by the apparatus in FIG. 3 can be reversed in a lossless way by the apparatus illustrated in FIG. 4. FIG. 4 corresponds to FIG. 2, except for the additional transformation/rounding stage for generating the second block of summed values from the further block of transformed output values, which is fed into input 120 in the embodiment shown in FIG. 2. It should be noted that the function of adding is respectively inverted by the function of subtracting. Further, it should be noted that an adder/subtracter pair (144 of FIG. 3 and 128 in FIG. 4) can also be provided with input amounts inverted with regard to the sign, so that the adder 144 actually performs a subtraction operation, when a group of input amounts is provided with negative signs in comparison to the illustrated case, as long as this is considered in the counterpart (128 in FIG. 4), which would then actually perform an addition operation.

Figure 3:
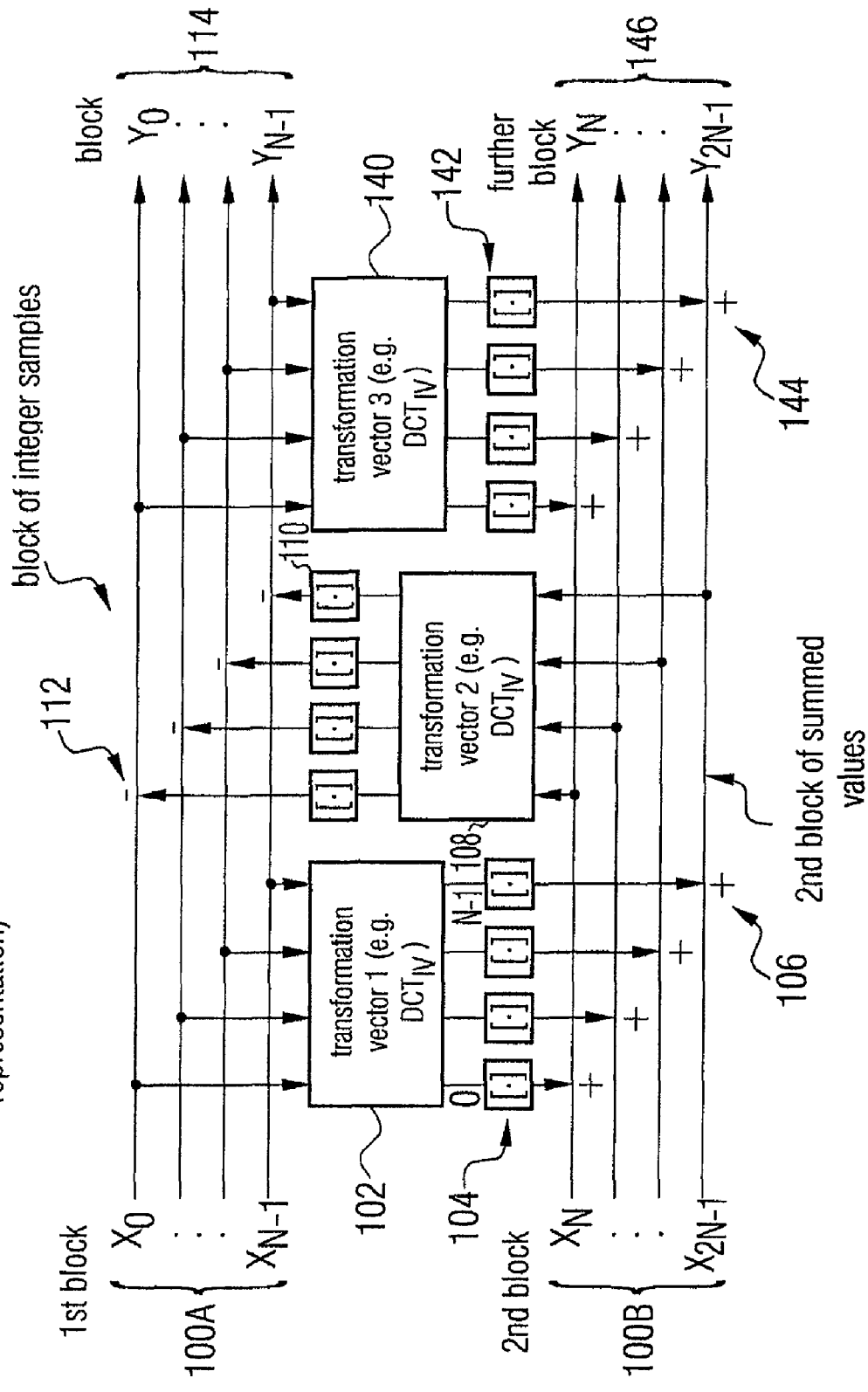
FIG. 3 is a block diagram of an apparatus for converting according to a preferred embodiment of the present invention.

The subtracter 128, the adder 134 as well as the further subtracter 154 shown in FIG. 4 are again formed to perform an individual value-wise addition/subtraction, wherein again the same ordinal number processing is used as has been explained with regard to FIG. 3. If another ordinal number usage would be used in FIG. 3, as is shown, this would be correspondingly considered in FIG. 4.

The first block of discrete values 136, indicated by $x_0$ to $x_{N-1}$, is already present at the output of the subtracter 134. In order to obtain also the remainder of the inverse transformed representation, the first block of discrete values is supplied to the transformer 150, which operates with the first transformation rule, whose values on the output side are rounded by the rounder 152 and subtracted from the second block of subtracted values at the output of the subtracter 128, in order to finally obtain also the second block of discrete values 156, indicated by $x_N, \ldots, x_{2N-1}$.

In the following, with reference to FIGS. 5-8, the mathematical background for the inventive apparatus as illustrated by FIGS. 1-4 will be discussed. By the inventive illustrated apparatus for converting and for inverse converting, respectively, integer transformation methods for lossless audio encoding are provided, where the approximation error is reduced. Above that, the calculation effort is also considered in that the known approach of applying the lifting scheme to every Givens rotation is no longer used, wherein here always trivial sum-difference butterflies occur. They increase the calculation effort significantly compared to the original non-integer version of the transformation to be reproduced.

Normally, the lifting scheme is used to obtain an invertible integer approximation of a Givens rotation.

$$\begin{pmatrix} \cos\alpha & -\sin\alpha \\ \sin\alpha & \cos\alpha \end{pmatrix} \cong \begin{pmatrix} 1 & \frac{\cos\alpha - 1}{\sin\alpha} \\ 0 & 1 \end{pmatrix} \begin{pmatrix} 1 & 0 \\ \sin\alpha & 1 \end{pmatrix} \begin{pmatrix} 1 & \frac{\cos\alpha - 1}{\sin\alpha} \\ 0 & 1 \end{pmatrix}$$

This integer approximation is obtained by using a rounding function after every addition, which means after every lifting step.

The lifting scheme can also be used for an invertible integer approximation of certain scaling operations. In the expert publication R. Geiger and G. Schuller, "Integer low delay and MDCT filter banks" Proc. of the Asilomar Conf. on Signals, Systems and Computers, 2002, the following lifting separation of a 2×2 scaling matrix with a determinant equal to 1 is illustrated and described:

$$\begin{pmatrix} d & 0 \\ 0 & d^{-1} \end{pmatrix} = \begin{pmatrix} -1 & 0 \\ d^{-1} & 1 \end{pmatrix} \begin{pmatrix} 1 & -d \\ 0 & 1 \end{pmatrix} \begin{pmatrix} 0 & 1 \\ 1 & d^{-1} \end{pmatrix}$$

According to the invention, this lifting separation, which is one-dimensional, which means it relates merely to a 2×2 scaling matrix, is extended to the multi-dimensional case. Individually, all values of the previous equation are replaced by n×n matrices, wherein n, which means the number of discrete values of a block, is larger than or equal to 2. Thus, the result is that for any n×n matrix T, which is preferably invertible, the following separation into 2n×2n block matrices is possible, wherein $E_n$ describes the n×n unit matrix:

$$\begin{pmatrix} T & 0 \\ 0 & T^{-1} \end{pmatrix} = \begin{pmatrix} -E_n & 0 \\ T^{-1} & E_n \end{pmatrix} \begin{pmatrix} E_n & -T \\ 0 & E_n \end{pmatrix} \begin{pmatrix} 0 & E_n \\ E_n & T^{-1} \end{pmatrix}$$

Apart from simples operations, such as permutations or multiplications with −1, all three blocks of this separation have the following general structure $$\begin{pmatrix} E_n & 0 \\ A & E_n \end{pmatrix}$$

For this 2n×2n block matrix, an inventively generalized lifting scheme can be used, which is subsequently also be referred to as multi-dimensional lifting.

For a vector of the values $x=(x_0, \ldots, x_{2n-1})$, the application of this block matrix provides the following equation:

$$\begin{pmatrix} E_n & 0 \\ A & E_n \end{pmatrix}$$
$$(x_0, \ldots, x_{2n-1})' = ((x_0, \ldots, x_{n-1}), (x_n, \ldots, x_{2n-1}) + A \cdot (x_0, \ldots, x_{n-1})')$$

It should be noted that there is a vector on the right side of the previous equation, whose dimension, which means the number of lines, is equal to 2n. The first n components, which means the components from 0 to n−1, correspond to $x_0$ to $y_{n-1}$. The second n components, which means the second half of the vector, which results on the right side of the previous equation, are equal to a sum of the second block of discrete values, which means $x_n, \ldots, x_{2n-1}$, but now summed with the multiplication of the matrix A, which corresponds to the transformation matrix of FIGS. 1-4 and the first block of discrete values $x_0, \ldots, x_{n-1}$. The transformation matrix represents the first, second and the third transformation rule, respectively.

Similar to the common lifting scheme with 2×2 matrices of the form $$\begin{pmatrix} 1 & a \\ 0 & 1 \end{pmatrix}$$

these 2n×2n matrices can be used for invertible integer approximations of the transformation T as follows. For integer input values $(x_0, \ldots, x_{2n-1})$, the floating-point output values $(y_0, \ldots, y_{n-1}) = A \cdot (x_0, \ldots, x_{n-1})$ are rounded to integer values, before they are added to the integer values $(x_n, \ldots, x_{2n-1})$. The inverse of the block matrix results as follows:

$$\begin{pmatrix} E_n & 0 \\ A & E_n \end{pmatrix}^{-1} = \begin{pmatrix} E_n & 0 \\ -A & E_n \end{pmatrix}$$

Figure 6:
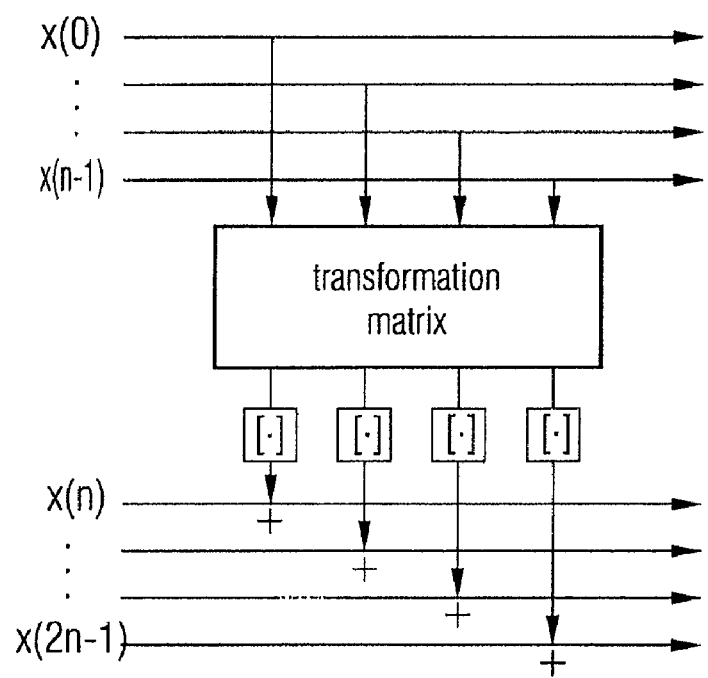
FIG. 6 is a detailed representation of a multi-dimensional lifting step with a towards transformation matrix.
Figure 7:
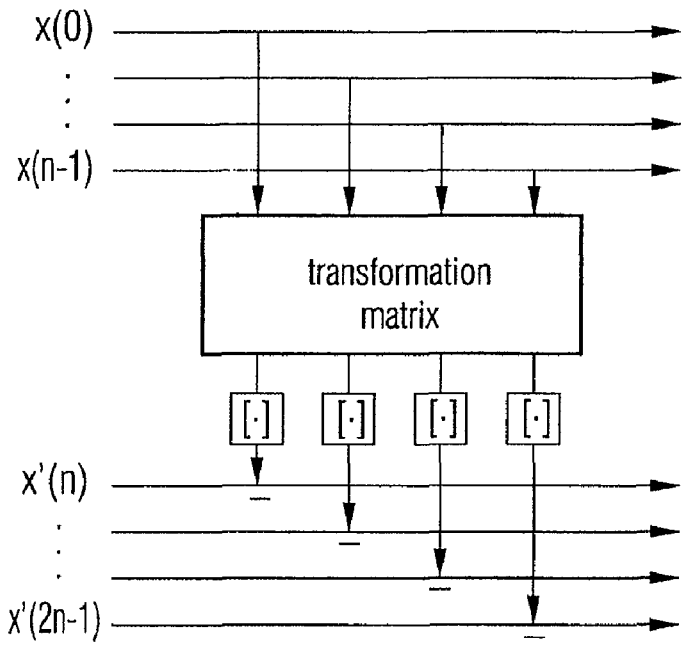
FIG. 7 is a representation of a multi-dimensional inverse lifting step with a back transformation matrix.

Thus, this process can be inverted without errors by simply using the same matrix A and the same rounding function, and by now subtracting the resulting values instead of the addition in the towards processing. The towards processing is illustrated in FIG. 6, while the back processing is illustrated in FIG. 7. It should be noted that the transformation matrix in FIG. 6 is identical to the transformation matrix in FIG. 7, which is preferred for simplicity reasons of the implementation.

Since the values $(x_0, \ldots, x_{n-1})$ are not modified in the forward step shown in FIG. 6, they are still present for the inverse step, which means the backward step in FIG. 7. It should be noted that there are no specific restrictions for the matrix A. Thus, the same does not necessarily have to be invertible.

Figure 10:
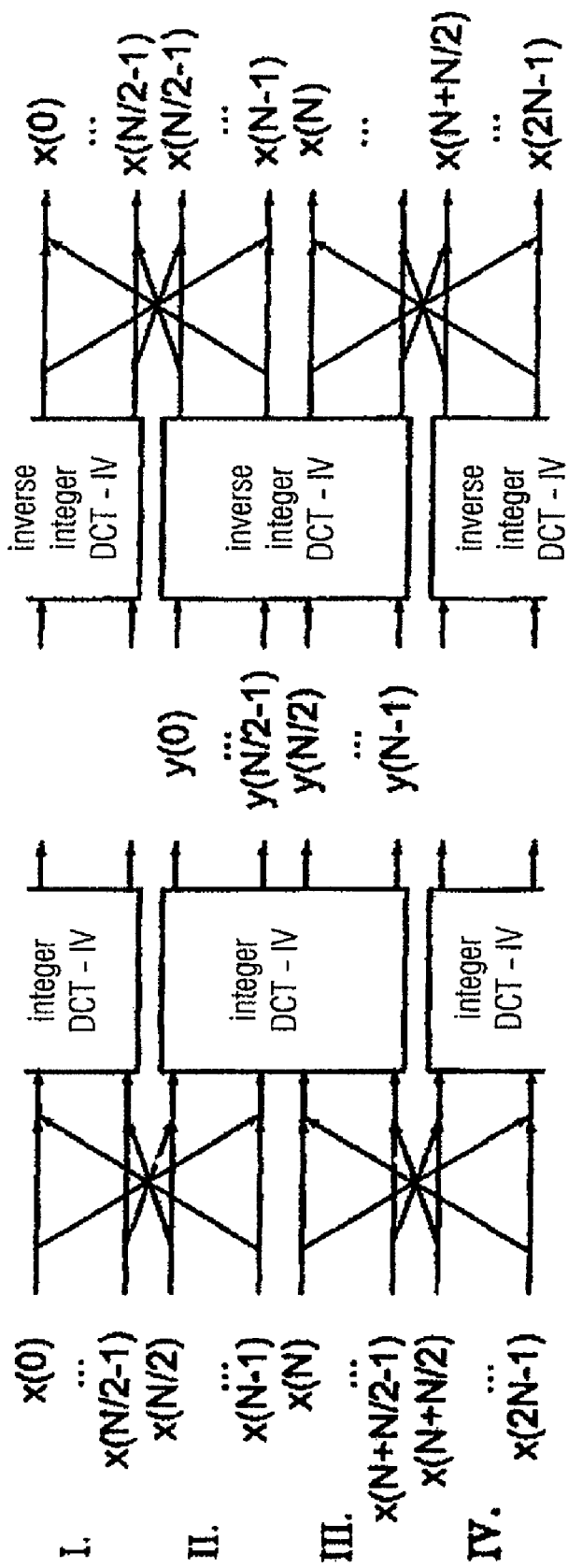
FIG. 10 is a schematic representation of the separation of an MDCT and an inverse MDCT in Givens rotations and two DCT-IV operations.

In order to obtain an invertible integer approximation of the known MDCT, the MDCT is separated into Givens rotations in a first stage, wherein this stage is the windowing stage, and into a subsequent DCT-IV stage. This separation is illustrated in FIG. 10, which will be discussed below and described in detail in DE 10129240 A1.

Contrary to the prior art, where the DCT-IV is separated into several stages of Givens rotation, according to the invention, the transformation itself is left and then rounded.

Thus, as is known, the integer approximation of the DCT-IV is performed by several stages of lifting-based Givens rotations. The number of Givens rotations is determined by the underlying used fast algorithm. In that way the number of Givens rotations is given by O (N log N) for a transformation of the length N. The windowing stage of every MDCT separation consists only of N/2 Givens rotations or of 3N/2 rounding steps. Thus, particularly in high transformation lengths, as they are used in audio encoding applications (for example 1,024), the integer approximation of the DCT-IV provides the main contribution for the approximation error.

The inventive approach uses the described multi-dimensional lifting scheme. Thereby, the number of rounding steps in the $DCT_{IV}$ is reduced to 3N/2, which means made equal to the number of rounding steps in the windowing stage, compared to about $2N \log_2 N$ rounding steps in the conventional lifting-based approach.

Figure 5:
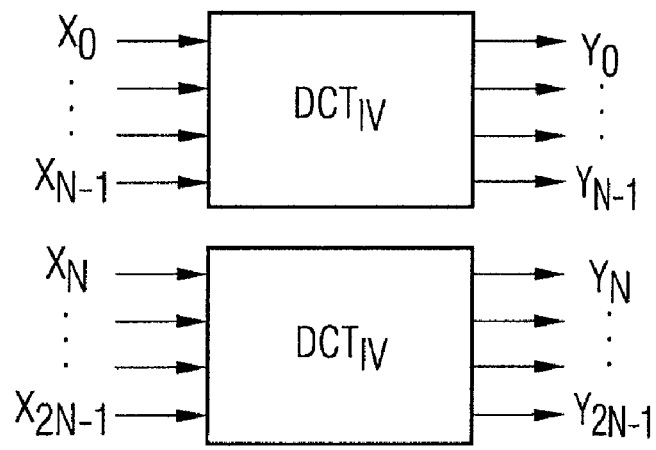
FIG. 5 is a representation of the transformation of two subsequent blocks of values, as applicable for the present invention.

According to the invention, the DCT-IV is applied simultaneously to two blocks of signals. One possibility therefor is shown in FIG. 5, where simply, for example, two blocks of samples subsequent in time are subject to a DCT-IV. The two blocks, which are subject to the two transformations, can also be samples of two channels of a multi-channel signal.

The separation of the above-described multi-dimensional lifting equation is applied to the transformation rule, which can also be considered as an N×N matrix. Since particularly in the DCT-IV, the inverse is again the DCT-IV, the following separation results for the concept shown in FIG. 5:

$$\begin{pmatrix} DCT_{IV} & 0 \\ 0 & DCT_{IV} \end{pmatrix} = \begin{pmatrix} -E_N & 0 \\ DCT_{IV} & E_N \end{pmatrix} \begin{pmatrix} E_N & -DCT_{IV} \\ 0 & E_N \end{pmatrix} \begin{pmatrix} 0 & E_N \\ E_N & DCT_{IV} \end{pmatrix}$$

The permutations of the multiplications with −1 can be extracted in individual block matrices, so that the following context results:

$$\begin{pmatrix} DCT_{IV} & 0 \\ 0 & DCT_{IV} \end{pmatrix} =$$

$$\begin{pmatrix} -E_N & 0 \\ 0 & E_N \end{pmatrix} \begin{pmatrix} E_N & 0 \\ DCT_{IV} & E_N \end{pmatrix} \begin{pmatrix} E_N & -DCT_{IV} \\ 0 & E_N \end{pmatrix} \begin{pmatrix} E_N & 0 \\ DCT_{IV} & E_N \end{pmatrix} \begin{pmatrix} 0 & E_N \\ E_N & 0 \end{pmatrix}$$

Thus, the application of a transformation to two blocks of signals, which means two blocks of discrete values, can be obtained with preferably three multi-dimensional lifting steps:

$$\begin{pmatrix} E_N & 0 \\ DCT_{IV} & E_N \end{pmatrix} \begin{pmatrix} E_N & -DCT_{IV} \\ 0 & E_N \end{pmatrix} \begin{pmatrix} E_N & 0 \\ DCT_{IV} & E_N \end{pmatrix}$$

The above equation is graphically illustrated in FIG. 3 with regard to a preferred embodiment of the present invention. The inverse conversion is, as has been explained, correspondingly illustrated in FIG. 4.

With the inventive approach, two DCT-IV transformations of length N can be implemented in an invertible way, wherein only 3N rounding steps are required, which means 3N/2 rounding steps per transformation.

The DCT-IV in the three multi-dimensional lifting steps can have an arbitrary implementation, which means, for example, a floating-point- or a fixed-point-based implementation. It does not even have to be invertible. It only has to be performed in exactly the same way both in the forward and the backward process. As a result, this concept is suitable for high transformation lengths, such as, for example, 1,024, as they are used in current audio encoding applications.

The whole computing complexity is equal to 1.5 times the computing complexity of the non-integer implementation of the two DCT-IV transformations. This computing complexity is still significantly lower than for conventional lifting-based integer implementations, which is about twice as complex as the conventional DCT-IV, since these implementations have to use the trivial plus/minus butterflies based on the used lifting scheme in order to obtain energy conservation, as is described in R. Geiger, T. Sporer, J. Koller and K. Brandenburg, "Audio Coding based on Integer Transforms" in 111th AES Convention, New York, 2001.

The illustrated approach will calculate at least two DCT-IV transformations simultaneously, which means within one conversion. This can, for example, be achieved by calculating the DCT-IV transformation for two subsequent blocks of the audio signal or two subsequent images of an image signal. In the case of a two-channel stereo signal, this can also be achieved by calculating the DCT-IV of the left and right channels in a conversion action and inverse conversion action, respectively. The first version introduces an additional delay of one block into the system. The second version is possible for stereo channels and generally for multi-channel signals, respectively.

Figure 8:
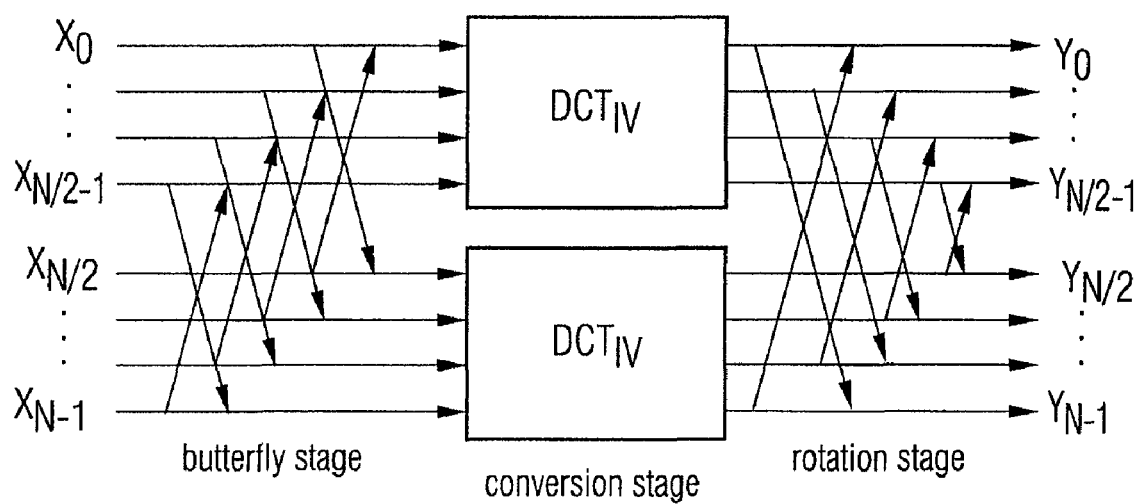
FIG. 8 is a representation of the present invention for separating a DCT-IV of the length N into two DCT-IV of the length N/2.

Alternatively, if both options are not desired, but if a normal block processing length of N values is to be maintained, the DCT-IV of the length N can be separated into two DCT-IV transformations of the length N/2. In this context, reference is made to Y. Zeng, G. Bi and Z. Lin, "Integer sinusoidal transforms based on lifting factorization", in Proc. OCASSP'01, May 2001, pp. 1,181-1,184, where this separation is performed. In addition to the two DCT transformations of the length N/2, several additional stages of Givens rotations are required. Further, in this algorithm, a block matrix $$\begin{pmatrix} E_{N/2} & -E_{N/2} \\ E_{N/2} & E_{N/2} \end{pmatrix},$$

i.e. N/2 plus/minus butterflies, a block diagonal matrix with N/2 Givens rotations and, further, several permutation matrices are used. By using these additional stages of N/2 Givens rotations, the multi-dimensional lifting approach can also be used for the calculation of only one DCT-IV of the length N. The fundamental structure of this algorithm is illustrated in FIG. 8, where, apart from the actual conversion stage, where two DCT-IV transformations with the length N/2 are used, first one butterfly stage is present to calculate the first and second blocks of discrete values, which normally have a length of N/2. On the output side, a rotation stage is provided to obtain the output values $y_0, \ldots, y_{N-1}$, which are equal to the output values of a DCT-IV operation of FIG. 5, as it can be seen from a comparison of the indices on the input side and the output side of FIGS. 8 and 5, from the block of output values of the transformed representation and the further block of output values of the transformed representation, which each have now merely N/2 values.

So far, merely the application of the multi-dimensional lifting to block matrices of the following form has been illustrated.

$$\begin{pmatrix} T & 0 \\ 0 & T^{-1} \end{pmatrix}$$

Still, it is also possible to separate other block matrices into multi-dimensional lifting steps. For example, the following separation can be used to implement the combination of one stage with normed plus/minus butterflies and two blocks of DCT-IV transformations by three steps of the multi-dimensional lifting:

$$\frac{1}{\sqrt{2}}\begin{pmatrix} E_N & E_N \\ -E_N & E_N \end{pmatrix}\begin{pmatrix} DCT_{IV} & 0 \\ 0 & DCT_{IV} \end{pmatrix} = \begin{pmatrix} \frac{1}{\sqrt{2}}DCT_{IV} & \frac{1}{\sqrt{2}}DCT_{IV} \\ -\frac{1}{\sqrt{2}}DCT_{IV} & \frac{1}{\sqrt{2}}DCT_{IV} \end{pmatrix} =$$

$$\begin{pmatrix} E_N & 0 \\ E_N - \sqrt{2}DCT_{IV} & E_N \end{pmatrix}\begin{pmatrix} E_N & \frac{1}{\sqrt{2}}DCT_{IV} \\ 0 & E_N \end{pmatrix}\begin{pmatrix} E_N & 0 \\ E_N - \sqrt{2}DCT_{IV} & E_N \end{pmatrix}$$

It becomes obvious from the previous equation that the first transformation rule used in the left bracket of the previous equation and the second transformation rule used in the middle bracket of the previous equation and the third transformation rule used in the last bracket of the previous equation do not have to be identical. Further, it becomes obvious from the previous equation that not only block matrices can be separated where merely the main diagonal elements are occupied, but that also fully occupied matrices can be processed according to the invention. Further, it should be noted that the present invention is not limited to the fact that the transformation rules, which are used in the conversion into a transformed representation, have to be identical or need to have any relation to each other, such that, for example, the second transformation rule is the inverse transformation rule of the first transformation rule. Generally, three different transformation rules could be used as long as this is considered in the inverse representation.

In this context, reference is made again to FIG. 3 and FIG. 4. When converting the discrete values to a transformed representation, the means 102 can be formed to implement any transformation rule 1. Further, the means 108 can also be formed to use any other or equal transformation rule, which is referred to as transformation rule 2. Further, the means 140 can be formed to use generally any transformation rule 3, which does not necessarily have to be equal to the first or second transformation rule.

However, in the inverse conversion of the transformed representation, an adaption to the transformation rules 1-3 illustrated in FIG. 3 has to be found, in that the first means 124 for converting does not perform any transformation rule but the transformation rule 3 performed in block 140 of FIG. 3. Correspondingly, means 130 in FIG. 4 has to perform the transformation rule 2, which has also been performed by block 108 in FIG. 3. Finally, means 150 of FIG. 4 has to perform the transformation rule 1, which has also been performed by means 102 of FIG. 3, so that a lossless inverse conversion is obtained.

Figure 11:
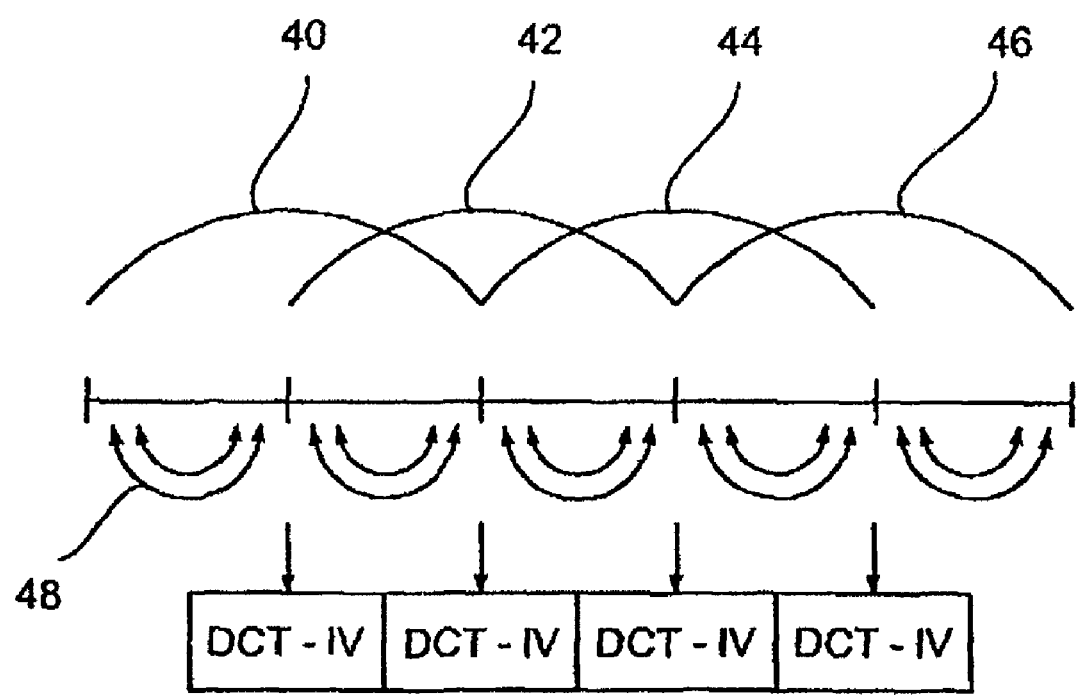
FIG. 11 is a representation for illustrating the separation of the MDCT with 50 percent overlapping into rotations and DCT-IV operations.

In the following, with reference to FIGS. 9-11, the separation of the MDCT windowing is represented again, as described in DE 10129240 A1, wherein the separation of the MDCT windowing into Givens rotations with lifting matrices and corresponding roundings can be combined advantageously with the concept illustrated in FIG. 1 for the conversion and in FIG. 2 for the inverse conversion, in order to obtain a complete integer MDCT approximation, which means an integer MDCT (IntMDCT) according to the present invention, wherein both a towards transformation concept and a back transformation concept have been performed with the example of an MDCT.

Figure 12A:
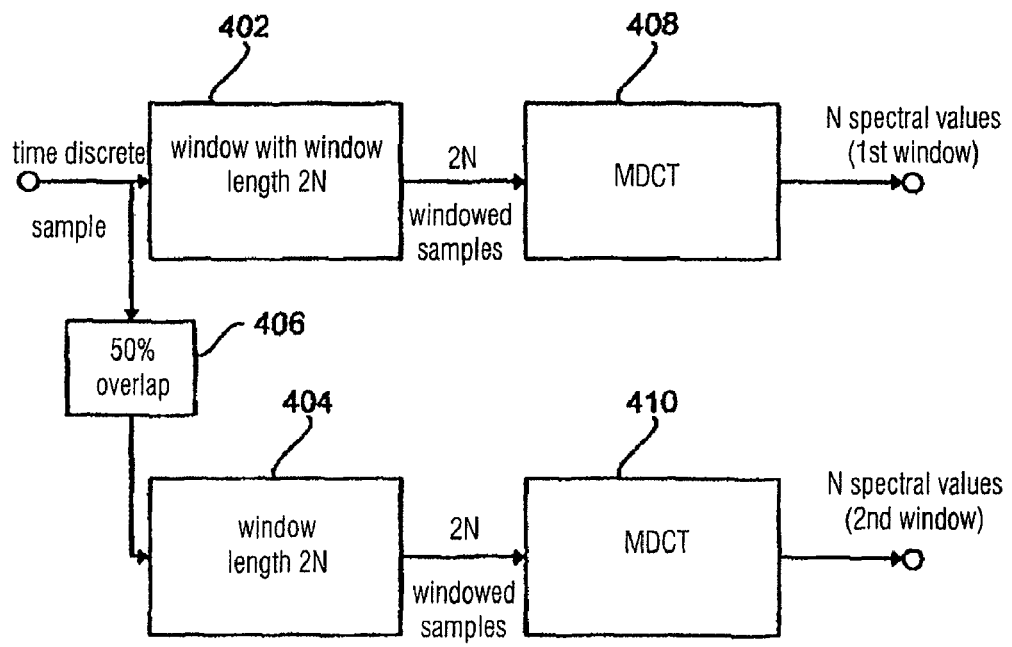
FIG. 12a is a schematic block diagram of a known encoder with MDCT and 50 percent overlapping.
Figure 12B:
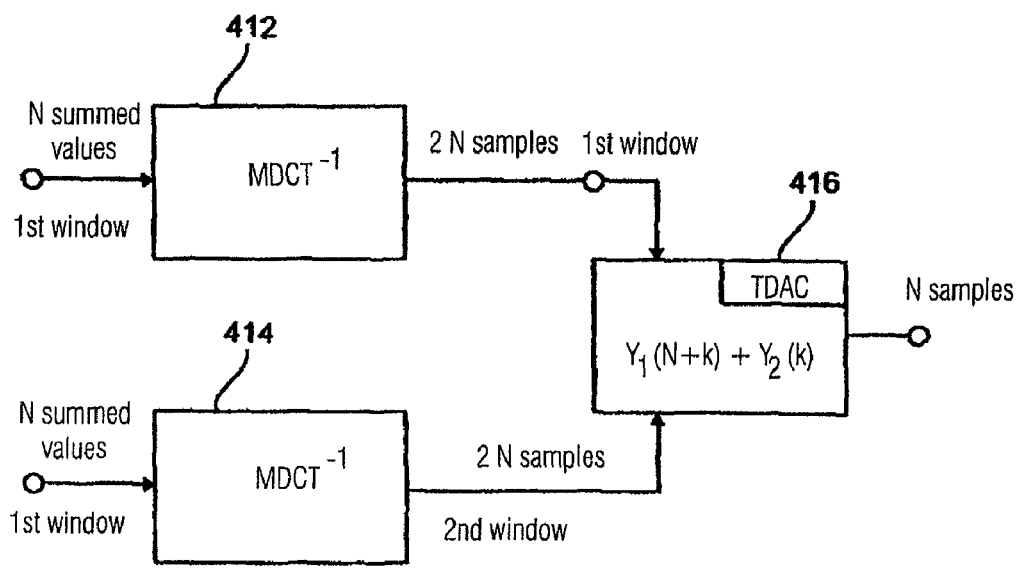

FIG. 9 shows an overview diagram for the inventively preferred apparatus for processing time-discrete samples, which represent an audio signal to obtain integer values on which the Int-MDCT integer transformation algorithm operates. The time-discrete samples are windowed by the apparatus shown in FIG. 9 and optionally converted into a spectral representation. The time-discrete samples fed into the apparatus at an input 10 are windowed with a window w with a length corresponding to 2N time-discrete samples to obtain integer windowed samples at an output 12, which are suitable for being converted into a spectral representation via a transformation and particularly the means 14 for performing an integer DCT. The integer DCT is formed to generate N output values of N input values, which is contrary to the MDCT function 408 of FIG. 12a, which generates merely N spectral values of 2N windowed samples due to the MDCT equation.

For windowing the time-discrete samples, first two time-discrete samples are chosen in a means 16, which together represent a vector of time-discrete samples. A time-discrete sample selected by the means 16 is in the first quarter of the window. The other time-discrete sample is in the second quarter of the window as will be discussed in more detail with reference to FIG. 11. The vector generated by means 16 is now provided with a rotation matrix of the dimension 2×2, wherein this operation is not performed immediately but via several so-called lifting matrices.

A lifting matrix has the characteristic that it only has one element depending on the window w and unequal "1" or "0".

The factorization of wavelet transforms into lifting steps is illustrated in the expert publication "Factoring Wavelet Transforms Into Lifting Steps", Ingrid Daubechies and Wim Sweldens, Preprint, Bell Laboratories, Lucent Technologies, 1996. Generally, a lifting scheme is a simple relationship between perfectly reconstructing filter pairs, which have the same low-pass or high-pass filter. Each pair of complementary filters can be factorized into lifting steps.

This applies particularly for Givens rotations. The case where the polyphase matrix is a Givens rotation will be considered. The following applies:

$$\begin{pmatrix} \cos\alpha & -\sin\alpha \\ \sin\alpha & \cos\alpha \end{pmatrix} = \begin{pmatrix} 1 & \frac{\cos\alpha - 1}{\sin\alpha} \\ 0 & 1 \end{pmatrix}\begin{pmatrix} 1 & 0 \\ \sin\alpha & 1 \end{pmatrix}\begin{pmatrix} 1 & \frac{\cos\alpha - 1}{\sin\alpha} \\ 0 & 1 \end{pmatrix} \quad (1)$$

Each of the three lifting matrices right of the equals sign has the value "1" as main diagonal element. Further, in every lifting matrix, a secondary diagonal element equals 0 and a secondary diagonal element depends on the rotation angle α.

The vector is now multiplied with the third lifting matrix, i.e. the lifting matrix on the very right in the above equation, to obtain a first result vector. This is illustrated in FIG. 9 by a means 18. Now, the first result vector is rounded with an arbitrary rounding function, which maps the amount of real numbers into the amount of integer numbers, as it is illustrated in FIG. 9 by a means 20. A rounded first result vector is obtained at the output of the means 20. The rounded first result vector is now fed into a means 22 for multiplying the same with the middle, i.e. second lifting matrix, to obtain a second result vector, which is again rounded in a means 24 to obtain a rounded second result vector. The rounded second result vector is now fed into a means 26 for multiplying the same with the lifting matrix shown on the left of the upper equation, i.e. the first lifting matrix, to obtain a third result vector, which is then finally rounded via a means 28 to finally obtain integer windowed samples at the output 12, which now, if a spectral representation of the same is desired, have to be processed by the means 14 to obtain integer spectral values at a spectral output 30.

The means 14 is preferably embodied as integer DCT.

The discrete cosine transform according to type 4 (DCT-IV) with a length N is given by the following equation:

$$X_t(m) = \sqrt{\frac{2}{N}} \sum_{k=0}^{N-1} x(k)\cos\left(\frac{\pi}{4N}(2k+1)(2m+1)\right) \quad (2)$$

The coefficients of the DCT-IV form an orthonormal N×N matrix. Every orthogonal N×N matrix can be separated into N(N−1)/2 Givens rotations as discussed in the expert publication P. P. Vaidyanathan, "Multirate Systems And Filter Banks", Prentice Hall, Englewood Cliffs, 1993. It should be noted that there are also other separations.

With regard to the classifications of the different DCT algorithms, reference should be made to H. S. Malvar, "Signal Processing With Lapped Transforms", Artech House, 1992. Generally, the DCT algorithms differ by the type of their basic functions. While the DCT-IV, which is preferred here, comprises non-symmetrical basic functions, i.e. a cosine quarter wave, a cosine ¾ wave, a cosine ⅝ wave, a cosine ⅞ wave, etc., the discrete cosine transform, for example of the type II (DCT-II), has axis-symmetrical and point-symmetrical basic functions. The $0^{th}$ basis function has a direct component, the first basic function is a half cosine wave, the second basic function is a whole cosine wave, etc. Due to the fact that the DCT-II particularly considers the constant component, it is used in video encoding but not in audio encoding since the constant component is not relevant in audio encoding, in contrary to video encoding.

In the following, reference is made to the fact how the rotation angle α of the Givens rotation depends on the window function.

An MDCT with a window length of 2N can be reduced to a discrete cosine transform of the type IV with a length N. This is achieved by performing the TDAC operation explicitly in the time domain and then applying the DCT-IV. In a 50% overlapping, the left half of the window for a block t overlaps with the right half of the previous block, i.e. the block t-1. The overlapping part of two subsequent blocks t-1 and t is preprocessed as follows in the time domain, i.e. prior to the transformation, i.e. between input 10 and output 12 of FIG. 9:

$$\begin{pmatrix} \tilde{x}_t(k) \\ \tilde{x}_{t-1}(N-1-k) \end{pmatrix} = \quad (3)$$

$$\begin{pmatrix} w\left(\frac{N}{2}+k\right) & -w\left(\frac{N}{2}-1-k\right) \\ w\left(\frac{N}{2}-1-k\right) & w\left(\frac{N}{2}+k\right) \end{pmatrix} \begin{pmatrix} x_t\left(\frac{N}{2}+k\right) \\ x_t\left(\frac{N}{2}-1-k\right) \end{pmatrix}$$

The values indicated with tilde are values at the output 12 of FIG. 9, while the x values without tilde in the above equation are the values at the input 10 and after the means 16 for selecting, respectively. The running index k runs from 0 to N/2−1, while w represents the window function.

From the TDAC condition for the window function w, the following context applies:

$$w\left(\frac{N}{2}+k\right)^2 + w\left(\frac{N}{2}-1-k\right)^2 = 1 \quad (4)$$

For certain angles $\alpha_k$, k=0, ..., N/2−1, this preprocessing in the time domain can be written as a Givens rotation, as has been explained.

The angle α of the Givens rotation depends on the window function w as follows:

$$\alpha = \arctan[w(N/2-1-k)/w(N/2+k)] \quad (5)$$

It should be noted that any window functions w can be used as long as they fulfill this TDAC condition.

In the following, a cascaded encoder and decoder is described with reference to FIG. 10. The time-discrete samples x(0) to x(2N−1), which are "windowed" together by one window, are first selected in such a way by means 16 of FIG. 9 that the sample x(0) and the sample x(N−1), i.e. a sample of the first quarter of the window and a sample of the second quarter of the window are selected to form the vector at the output of the means 16. The crossing arrows represent schematically the lifting multiplications and subsequent roundings of means 18, 20 and 22, 24 and 26, 28, respectively, to obtain the integer windowed samples at the input of the DCT-IV blocks.

When the first vector has been processed as described above, further, a second vector of the samples x(N/2−1) and x(n/2), i.e. again a sample of the first quarter of the window and a sample of the second quarter of the window, is selected and again processed by the algorithm described in FIG. 9. Analogously, all other sample pairs of the first and second quarters of the window are processed. The same processing is performed for the third and fourth quarter of the first window. Now, 2N windowed integer samples are present at the output 12 which are now fed into a DCT-IV transformation as illustrated in FIG. 10. Particularly, the integer windowed samples of the second and third quarters are fed into a DCT. The windowed integer samples of the first quarter of the window are processed in a previous DCT-IV together with the windowed integer samples of the fourth quarter of the previous window. Analogously, the fourth quarter of the windowed integer samples in FIG. 10 is fed into a DCT-IV transformation with the first quarter of the next window. The middle integral DCT-IV transformation shown in FIG. 10 now provides N integer spectral values y(0) to y(N−1). These integer spectral values can now be easily entropy encoded, without requiring an intermediate quantization, since the windowing and transformation provides integer output values.

A decoder is illustrated in the right half of FIG. 10. The decoder consisting of inverse transformation and "inverse windowing" operates inversely to the encoder. It is known that an inverse DCT-IV can be used for inverse transformation of a DCT-IV, as illustrated in FIG. 10. The output values of the decoder DCT-IV 34 are now inversely processed, as illustrated in FIG. 10, with the corresponding values of the previous transformation and the following transformation, respectively, in order to generate time-discrete audio samples x(0) to x(2N−1) again from the integer windowed samples at the output of the means 34 and the previous and subsequent transformation, respectively.

The operation on the output side is performed by an inverse Givens rotation, i.e. such that the blocks 26, 28 and 22, 24 and 18, 20, respectively, are passed in the opposite direction. This is illustrated in more detail with regard to the second lifting matrix of equation 1. If (in the encoder) the second result vector is formed by a multiplication of the rounded first result vector with the second lifting matrix (means 22), the following expression will result:

$$(x,y) \mapsto (x, y + x \sin \alpha) \quad (6)$$

The values x, y on the right side of equation 6 are integers. This does not apply, however, for the value X sin α. Here, the rounding function r has to be introduced, as illustrated in the subsequent equation $$(x,y) \mapsto (x, y + r(x \sin \alpha)) \quad (7).$$

This operation is performed by means 24.

The inverse mapping (in the decoder) is defined as follows:

$$(x',y') \mapsto (x', y' - r(x' \sin \alpha)) \quad (8)$$

Due to the minus sign before the rounding operation it becomes obvious that the integer approximation of the lifting step can be inversed without introducing an error. The application of this approximation to each of the three lifting steps leads to an integer approximation of the Givens rotation. The rounded rotation (in the encoder) can be inversed (in the decoder) without introducing an error and by passing through the inverse rounded lifting steps in reverse order, i.e. when the algorithm of FIG. 9 is performed from bottom to top during decoding.

When the rounding function r is point-symmetrical, the inverse rounded rotation is identical to the rounded rotation with the angle −α and is as follows:

$$\begin{pmatrix} \cos\alpha & \sin\alpha \\ -\sin\alpha & \cos\alpha \end{pmatrix} \quad (9)$$

The lifting matrices for the decoder, i.e. for the inverse Givens rotation, results in this case immediately from equation (1) by merely replacing the expression "sin α" by the expression "−sin α".

In the following, the separation of a common MDCT with overlapping windows 40 to 46 is illustrated again with regard to FIG. 11. The windows 40 to 46 each overlap by 50%. Per window, Givens rotations are performed within the first and second quarters of a window and within the third and fourth quarters of a window, respectively, as is schematically illustrated by the arrows 48. Then, the rotated values, i.e. the windowed integer samples, are fed into an N-to-N DCT such that always the second and the third quarter of a window and the fourth and first quarter of a subsequent window, respectively, are converted together into a spectral representation via a DCT-IV algorithm.

Thus, the common Givens rotations are separated into lifting matrices, which are performed in sequence, wherein a rounding step is introduced after every lifting matrix multiplication, such that the floating-point numbers are rounded immediately after their occurrence, such that the result vector has merely integers prior to every multiplication of a result vector with a lifting matrix.

Thus, the output values always remain integer, wherein it is preferred to also use integer input values. This represents no limitation, since, for example, any PCM samples, as they are stored on a CD, are integer values whose value range varies depending on bit width, i.e. depending on whether the time-discrete digital input values are 16-bit values or 24-bit values. Still, the whole process is invertible, as has been discussed, by performing the inverse rotations in an inverse direction. Thus, there exists an integer approximation of the MDCT with perfect reconstruction, which means a lossless transformation.

The shown transformation provides integer output values instead of floating-point values. It provides a perfect reconstruction, so that no error is introduced when a forward and then a backward transformation are performed. According to a preferred embodiment of the present invention, the transformation is a replacement for the modified discrete cosine transform. Other transformation methods can also be performed in an integer way, as long as a separation into rotations and a separation of the rotations into lifting steps is possible.

The integer MDCT has the most favorable characteristics of the MDCT. It has an overlapping structure, whereby a better frequency selectivity is obtained than with non-overlapping block transformations. Due to the TDAC function, which is already considered during windowing prior to the transformation, critical sampling is maintained, so that the total number of spectral values representing an audio signal is equal to the total number of input samples.

Compared to a normal MDCT, which provides floating-point samples, the described preferred integer transformation shows that compared to the normal MDCT with low signal level, the noise is increased merely in the spectral range, while this noise increase is not noticeable in significant signal levels. Instead, the integer processing lends itself for efficient hardware implementation, since merely multiplication steps are used which can easily be separated into shift/add steps which can be implemented in hardware in a simple and fast way. Of course, software implementation is also possible.

The integer transformation provides a good spectral representation of the audio signal and still remains in the range of integer numbers. If it is applied to tonal parts of an audio signal, this results in a good energy concentration. Thereby, an efficient lossless encoding scheme can be constructed, by simply cascading the windowing/transformation illustrated in FIG. 9 with an entropy encoder. Particularly stacked encoding using escape values as used in MPEG AAC is favorable. It is preferred to scale all values down by a certain power of two until they fit into a desired code table to then additionally encode the omitted least significant bits. Compared to the alternative of using larger code tables, the described alternative is more favorable with regard to the memory consumption for storing the code tables. An almost lossless encoder could also be obtained by simply omitting certain ones of the least significant bits.

Particularly for tonal signals, entropy encoding of the integer spectral values enables a high encoder gain. For transient parts of the signal, the encoder gain is low, due to the flat spectrum of transient signals, i.e. due to a low number of spectral values which are equal or almost 0.

As described in J. Herre, J. D. Johnston: "Enhancing the Performance of Perceptual Audio Coders by Using Temporal Noise Shaping (TNS)" 101. AES Convention, Los Angeles, 1996, Preprint 4384, this flatness can be used by using a linear prediction in the frequency range. One alternative is a prediction with open loop. Another alternative is the predictor with closed loop. The first alternative, i.e. the predictor with open loop, is called TNS. The quantization after prediction leads to an adaption of the resulting quantization noise to the time structure of the audio signal and thus prevents pre-echoes in psycho-acoustic audio encoders. For lossless audio encoding, the second alternative, i.e. with a predictor with closed loop, is more suitable, since the prediction with closed loop allows an exact reconstruction of the input signal. When this technique is applied to a generated spectrum, a rounding step has to be performed after every step of the prediction filter to remain in the range of integers. By using the inverse filter and the same rounding function, the original spectrum can be exactly reconstructed.

In order to use the redundancy between two channels for data reduction, a center-side encoding can be used in a lossless way, when a rounded rotation with an angle $\pi/4$ is used. Compared to the alternative of calculating the sum and difference of the left and right channels of a stereo signal, the rounded rotation has the advantage of energy conservation. The usage of so-called joint-stereo encoding techniques can be turned on or off for every band, as it is performed in a standard MPEG AAC. Further rotation angles can also be considered to reduce a redundancy between two channels in a more flexible way.

Depending on the circumstances, the inventive method for converting and for inverse converting, respectively, and for time-frequency transforming or frequency-time transforming, respectively, can be implemented in hardware or in software. The implementation can be embodied on digital memory media, particularly a disc or a CD with electronically readable control signals, which can cooperate with a programmable computer system such that the method is performed. Generally, the invention thus also consists of a computer program product with a program code stored on a machine-readable carrier for performing an inventive method when the computer program runs on a computer. In other words, the invention can be realized as a computer program with a program code for performing the method when the computer program runs on a computer.

While this invention has been described in terms of several preferred embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for converting discrete values into a transformed representation with integer values, wherein the discrete values have audio and/or image information, comprising:
    a processor for processing a first block of discrete values by using a first transformation rule to obtain a first block of transformed values;
    a rounder for rounding the first block of transformed values to obtain a first block of rounded transformed values;
    a summator for summing the first block of rounded transformed values to a second block of discrete values to obtain a second block of summed values;
    a processor for processing the second block of summed values by using a second transformation rule to obtain a second block of transformed values;
    a rounder for rounding the second block of transformed values to obtain a second block of rounded transformed values; and
    a subtractor for subtracting the second block of rounded transformed values from the first block of discrete values to obtain a block of integer output values of the transformed representation.

2. The apparatus according to claim 1, further comprising:
    a processor for processing the block of integer output values by using a third transformation rule to obtain a block of transformed output values;
    a rounder for rounding the block of transformed output values to obtain a block of rounded transformed output values; and
    a summator for summing the block of rounded transformed output values and the second block of summed values to obtain a further block of integer output values of the transformed representation.

3. The apparatus according to claim 2, wherein the first transformation rule, the second transformation rule and the third transformation rule, respectively, comprise a transformation matrix.

4. The apparatus according to claim 3,
    wherein the transformation matrix underlying the first transformation rule, the transformation matrix underlying the second transformation rule and the transformation matrix underlying the third transformation rule, respectively, are each a square matrix having a number of lines and columns, respectively, which are equal to a number of discrete values in the first or second blocks.

5. The apparatus according to claim 2, wherein
    the first transformation rule, the second transformation rule and the third transformation rule, respectively, are identical to one another.

6. The apparatus according to claim 2, wherein the first transformation rule and the third transformation rule are a forward transform rule, while the second transformation rule is a back transform rule.

7. The apparatus according to claim 2, wherein
    the rounder for rounding the first block and the rounder for rounding the second block and the rounder for rounding the block of transformed output values, respectively, are formed to round according to the rounding function providing rounded results, the accuracy of which is less than a machine accuracy of a computer comprising the apparatus.

8. The apparatus according to claim 1,
    wherein the first block of discrete values has discrete values of an ordinal number 0 to an ordinal number N−1,
    wherein the second block of discrete values has discrete values of an ordinal number N to an ordinal number 2N−1,
    wherein the first block of rounded transformed values has an ordinal number of 0 to N−1 and wherein the summator is formed to perform a value-wise addition, so that a value of the block of rounded transformed values with an ordinal number i is added to a value of the second block of discrete values with an ordinal number i+N, wherein i is a running index extending from 0 to N−1.

9. The apparatus according to claim 1,
    wherein the first block of discrete values has discrete values of an ordinal number 0 to an ordinal number N−1, wherein the second block of discrete values has discrete values of an ordinal number 0 to an ordinal number 2N−1, wherein the second block of rounded transformed values has values between an ordinal number N and 2N−1, wherein the subtractor for subtracting is formed to subtract a value of the block of rounded transformed values with the ordinal number n+i from a value of the first block with the ordinal number i, wherein i is a running index extending from 0 to N−1.

10. The apparatus according to claim 1, wherein the first and second blocks of discrete values comprise integer discrete values.

11. The apparatus according to claim 1, wherein the rounder for rounding the first block of transformed values or the rounder for rounding the second block of transformed values are formed to round according to the same rounding specification.

12. The apparatus according to claim 1, wherein the processor for processing according to the first transformation rule and processor for processing according to the second transformation rule are formed in a transformer, and wherein further a sequence control is provided, which is formed to supply first the first block of discrete values and later the second block of summed values to the transformer.

13. The apparatus according to claim 1, wherein the rounder for rounding the first block of transformed values and the rounder for rounding the second block of transformed values are formed in a rounder, and wherein further a sequence control is provided to supply first the first block of discrete values and later the second block of transformed values to the rounder.

14. The apparatus according to claim 1, wherein the first and second blocks of discrete values are audio samples of first and second channels of a multichannel audio signal.

15. The apparatus according to claim 1, wherein the first block and the second block are subsequent time samples of an audio signal.

16. A forward transform apparatus, comprising:

a windower for windowing a first block of samples representing an audio signal or an image signal, and for windowing a second block of samples representing an audio signal or an image signal by using several lifting matrices and subsequent rounding operations to obtain a first block of discrete values and a second block of discrete values; and an apparatus according to claim 1 to obtain a transformed representation from the first and second blocks with integer output values.

17. A method for converting discrete values into a transformed representation with integer values, wherein the discrete values have audio and/or image information, comprising:

processing, by a processor for processing a first block of discrete values, the first block of discrete values by using a first transformation rule to obtain a first block of transformed values;

rounding, by a rounder for rounding the first block of transformed values, the first block of transformed values to obtain a first block of rounded transformed values;

summing, by a summator, the first block of rounded transformed values to a second block of discrete values to obtain a second block of summed values;

processing, by a processor for processing the second block of summed values, the second block of summed values by using a second transformation rule to obtain a second block of transformed values;

rounding, by a rounder for rounding the second block of transformed values, the second block of transformed values to obtain a second block of rounded transformed values; and subtracting, by a subtractor, the second block of rounded transformed values from the first block of discrete values to obtain a block of integer output values of the transformed representation, wherein the processor for processing a first block of discrete values, the rounder for rounding the first block of transformed values, the summator, the processor for processing the second block of summed values, the rounder for rounding the second block of transformed values, or the subtractor comprises a hardware implementation.

18. A forward transform method, comprising:

windowing, by a windower, a first block of samples representing an audio signal or an image signal, and windowing a second block of samples representing an audio signal or an image signal by using several lifting matrices and subsequent rounding operations to obtain a first block of discrete values and a second block of discrete values; and a method according to claim 17 to obtain a transformed representation from the first and second blocks with integer output values, wherein the method according to claim 17 is performed by an apparatus for converting, wherein the windower, or the apparatus for converting comprises a hardware implementation.

19. An apparatus for inverse conversion of a block of integer values and a second block of values, the second block of values being derived from a first block of discrete values and a second block of discrete values using a conversion process, comprising:

a processor for processing the second block of values by using a second transformation rule to obtain a first block of transformed output values;

a rounder for rounding the first block of transformed output values to obtain a first block of rounded transformed values;

a summator for summing the first block of rounded transformed output values to the block of integer values, whereby the first block of discrete values is obtained;

a processor for processing the first block of discrete values by using a first transformation rule to obtain a second block of transformed values;

a rounder for rounding the second block of transformed values to obtain a block of rounded transformed values; and a subtractor for subtracting the block of rounded transformed values from the second block of values, whereby the second block of discrete values is obtained.

20. The apparatus according to claim 19, wherein a further block of integer values of a transformed representation has been calculated, by an apparatus for converting, from the second block of values by processing the block of integer values by using a third transformation rule to obtain a block of transformed output values, by rounding the block of transformed output values to obtain a block of rounded transformed output values, and by summing the block of rounded transformed output values and the second block of values to obtain the further block of integer values of the transformed representation, the apparatus further comprising:
a processor for processing the block of integer values by using the third transformation rule to obtain a first block of transformed output values;
a rounder for rounding the first block of transformed output values to obtain a first block of rounded transformed output values; and
a subtractor for subtracting the first block of rounded transformed output values from the further block of output values to obtain the second block of values.

21. A back transform apparatus, comprising:
an apparatus according to claims 19; and
an inverse windower for inverse windowing of the first and second blocks of discrete values by using lifting matrices and subsequent rounding operations to obtain first and second blocks of original values representing audio samples or image samples.

22. Apparatus of claim 19, wherein the second block of values is a transformed representation of discrete values, wherein the block of integer values and the second block of values are derived, by an apparatus for converting, from the first and second blocks of discrete values, by processing a first block of discrete values by using the first transformation rule to obtain a first block of transformed values, rounding the first block of transformed values to obtain a first block of rounded transformed values, summing the first block of rounded transformed values to a second block of discrete values to obtain the second block of values, processing the second block of values by using the second transformation rule to obtain a second block of transformed values, rounding the second block of transformed values to obtain a second block of rounded transformed values, and subtracting the second block of rounded transformed values from the first block of discrete values to obtain a block of integer values of the transformed representation.

23. A method for inversely converting a block of integer values and a second block of values, the second block of values being derived from a first block of discrete values and a second block of discrete values using a conversion process, comprising:
processing, by a processor for processing the second block of values, the second block of values by using a second transformation rule to obtain a first block of transformed output values;
rounding, by a rounder for rounding the first block of transformed output values, the first block of transformed output values to obtain a first block of rounded transformed values;
summing, by a summator, the first block of rounded transformed output values to the block of integer values, whereby the first block of discrete values is obtained;
processing, by a processor for processing the first block of discrete values, the first block of discrete values by using a first transformation rule to obtain a second block of transformed values;
rounding, by a rounder for rounding the second block of transformed values, the second block of transformed values to obtain a block of rounded transformed values; and
subtracting, by a subtractor, the block of rounded transformed values from the second block of values, whereby the second block of discrete values is obtained,
wherein the processor for processing the second block of values, the rounder for rounding the first block of transformed output values, the summator, the processor for processing the first block of discrete values, the rounder for rounding the second block of transformed values, or the subtractor comprises a hardware implementation.

24. A back transform method, comprising:
a method according to claim 23, performed by an apparatus for inverse conversion; and
inverse windowing, by an inverse windower, of the first and second blocks of discrete values by using lifting matrices and subsequent rounding operations to obtain first and second blocks of original values representing audio samples or image samples,
wherein the apparatus for inverse conversion, or the inverse windower comprises a hardware implementation.

25. Method of claim 23, wherein the second block of values are a transformed representation of discrete values, wherein the block of integer values and the second block of values are derived, by an apparatus for converting, from the first and second blocks of discrete values, by processing a first block of discrete values by using the first transformation rule to obtain a first block of transformed values, rounding the first block of transformed values to obtain a first block of rounded transformed values, summing the first block of rounded transformed values to a second block of discrete values to obtain the second block of values, processing the second block of values by using the second transformation rule to obtain a second block of transformed values, rounding the second block of transformed values to obtain a second block of rounded transformed values, and subtracting the second block of rounded transformed values from the first block of discrete values to obtain a block of integer values of the transformed representation.

26. A digital storage medium having stored thereon a computer program with a program code for performing a method for converting discrete values into a transformed representation with integer values, wherein the discrete values have audio and/or image information, comprising:
processing a first block of discrete values by using a first transformation rule to obtain a first block of transformed values;
rounding the first block of transformed values to obtain a first block of rounded transformed values;
summing the first block of rounded transformed values to a second block of discrete values to obtain a second block of summed values;
processing the second block of summed values by using a second transformation rule to obtain a second block of transformed values;
rounding the second block of transformed values to obtain a second block of rounded transformed values; and
subtracting the second block of rounded transformed values from the first block of discrete values to obtain a block of integer output values of the transformed representation;
when the computer program runs on a computer.

27. A digital storage medium having stored thereon a computer program with a program code for performing a method for inversely converting a block of integer output values and a second block of summed values, which are a transformed representation of discrete values, to obtain first and second blocks of discrete values, wherein the block of integer output values and the second block of summed values have been derived from the first and second blocks of discrete values, by processing a first block of discrete values by using a first transformation rule to obtain a first block of transformed values, rounding the first block of transformed values to obtain a first block of rounded transformed values, summing the first block of rounded transformed values to a second block of discrete values to obtain the second block of summed values, processing the second block of summed values by using a second transformation rule to obtain a second block of transformed values, rounding the second block of transformed values to obtain a second block of rounded transformed values, and subtracting the second block of rounded transformed values from the first block of discrete values to obtain a block of integer output values of the transformed representation, comprising:

processing the second block of summed values by using the second transformation rule to obtain a first block of transformed output values;

rounding the first block of transformed output values to obtain a first block of rounded transformed values;

summing the first block of rounded transformed output values to the block of integer output values to obtain the first block of discrete values;

processing the first block of discrete values by using the first transformation rule to obtain a second block of transformed values;

rounding the second block of transformed values to obtain a block of rounded transformed values; and subtracting the block of rounded transformed values from the second block of summed values to obtain the second block of discrete values;

when the computer program runs on a computer.

* * * * *